US007878322B2

(12) United States Patent
Kawamata

(10) Patent No.: US 7,878,322 B2
(45) Date of Patent: Feb. 1, 2011

(54) STRUCTURE FOR SUPPORTING PULLEY HOLDER, AND PULLEY HOLDER

(75) Inventor: Noriyuki Kawamata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 492 days.

(21) Appl. No.: 11/616,997

(22) Filed: Dec. 28, 2006

(65) Prior Publication Data

US 2007/0151830 A1 Jul. 5, 2007

(30) Foreign Application Priority Data

Dec. 29, 2005 (JP) ............................ 2005-380663

(51) Int. Cl.
*B65G 23/44* (2006.01)

(52) U.S. Cl. ......................... 198/813; 198/832; 271/84

(58) Field of Classification Search ................ 198/813; 400/320
See application file for complete search history.

(56) References Cited

U.S. PATENT DOCUMENTS

| | | | | |
|---|---|---|---|---|
| 4,610,645 | A | 9/1986 | Donn et al. | |
| 4,746,237 | A * | 5/1988 | Takeda | 400/335 |
| 6,123,473 | A * | 9/2000 | Guillen et al. | 400/335 |
| 6,690,494 | B1 * | 2/2004 | Yamada | 358/497 |
| 2005/0243125 | A1 | 11/2005 | Ishikawa | |
| 2006/0157381 | A1 | 7/2006 | Adams et al. | |
| 2007/0155561 | A1 | 7/2007 | Sugiura | |

FOREIGN PATENT DOCUMENTS

| | | | |
|---|---|---|---|
| JP | 574848 | U | 10/1993 |
| JP | 6011004 | A | 1/1994 |
| JP | 7001786 | A | 1/1995 |
| JP | 3016172 | U | 7/1995 |
| JP | 7293671 | A | 11/1995 |
| JP | 9240100 | A | 9/1997 |
| JP | 10076731 | A | 3/1998 |
| JP | 10129069 | A | 5/1998 |
| JP | 2000037921 | A | 1/2000 |
| JP | 2001058435 | A | 3/2001 |
| JP | 2001158145 | A | 6/2001 |
| JP | 2001171193 | A | 6/2001 |
| JP | 20023156260 | A | 10/2002 |
| JP | 2005-313492 | A | 11/2005 |

OTHER PUBLICATIONS

U.S. Patent and Trademark Office, Office Action from commonly-assigned, co-pending U.S. Appl. No. 11/616,115, notification sent on Feb. 25, 2009.

* cited by examiner

*Primary Examiner*—Gene Crawford
*Assistant Examiner*—Kavel P Singh
(74) *Attorney, Agent, or Firm*—Baker Botts L.L.P.

(57) ABSTRACT

A structure for supporting a pulley holder is provided with a pulley holder for rotatably supporting a pulley around which a belt is movably wound, a frame member that slidably supports the pulley holder along the direction of stretching the belt, and an urging member that elastically urges the pulley holder in a belt tensioning direction in which the belt is tensioned. The pulley holder has fitting portion that is stepwise formed along the belt tensioning direction, and the frame member has a fitting opening whose edge is stepwise formed corresponding to the fitting portion.

13 Claims, 22 Drawing Sheets

STRUCTURE FOR SUPPORTING PULLEY HOLDER, AND PULLEY HOLDER

CROSS-REFERENCE TO RELATED APPLICATIONS

This non-provisional application claims priority under 35 U.S.C, §119(a) on Patent Application No. 2005-380663 filed in Japan on Dec. 29, 2005, the entire contents of which are hereby incorporated by reference.

BACKGROUND OF THE INVENTION

1. Field of the Invention

The present invention relates to a structure for supporting a pulley holder which comprises a pulley holder for rotatably supporting pulleys on which a belt is wound in a state capable of circular movement, a frame member for slidably supporting the pulley holder in a direction of stretching the belt, and an urging member for elastically urging the pulley holder in a tension direction in which the belt is tensioned. More particularly, the present invention relates to a structure for supporting a pulley holder formed in a shape having draft angle as having been molded by molding die. The present invention further relates to a pulley holder supported by such supporting structure.

2. Description of the Related Art

In an image recording apparatus of ink jet type, a driving transmission mechanism for transmitting a driving force to a carriage which is supported in a state capable of sliding movement in a predetermined direction is known (See Japanese Patent Application Laid-open No. 07-293671 (1995) and Japanese Patent Application Laid-open No. 2001-158145). FIG. 1A and FIG. 1B exemplify a driving transmission mechanism 220 employing known pulleys. FIG. 1A is a plan view of the driving transmission mechanism 220 while FIG. 1B is a front view of the same. As shown in FIG. 1A and FIG. 1B, the driving transmission mechanism 220 has a configuration in which a driving pulley unit 233 and a driven pulley unit 223 are mounted on a frame 221 as spaced from each other, and an endless belt 222 is stretched between the two pulley units 233 and 223.

The driving pulley unit 233 is configured by a motor 236 mounted on the lower surface 221*b* of the frame 221, a motor shaft 235 penetrating from the lower surface 221*b* through the frame 221 to the upper surface 221*a*, and a driving pulley 234 coupled to the motor shaft 235. The driven pulley unit 223 is configured by a pulley holder 225 fixedly mounted to the frame 221 and a driven pulley 224. The belt 222 is wound around the driving pulley 234 and the driven pulley 224. By applying rotational force of the driving pulley 234, the belt 222 is conveyed as if it circularly moves between the driving pulley 234 and the driven pulley 224. The belt 222 thus circularly moves is joined to a carriage as described above. As the belt 222 circularly moves, the carriage is moved in a predetermined direction.

FIG. 2A and FIG. 2B are side views showing a configuration of the driven pulley unit 223 of a known driving transmission mechanism. As shown in FIG. 2A and FIG. 2B, the pulley holder 225 is configured mainly by a support arm 229 for rotatably supporting the driven pulley 224, an insertion portion 238 inserted in an insertion opening 241 (See FIG. 4) formed in the frame 221, and a restricting portion 226 for restricting the downward movement of the insertion portion 238. In FIG. 2A and FIG. 2B, a lower portion of the restricting portion 226 beneath the lower surface 226*a* is the insertion portion 238. The insertion portion 238 has stopper portions 227 protruding perpendicular to the drawing sheet surface of FIGS. 2A and 2B. A pair of grooves 228 are provided between the stopper portions 227 and the restricting portion 226 for engagement with corresponding engaging edges 242 (See FIG. 4) provided at the insertion opening 241 of the frame 221. The pulley holder 225 is inserted with its insertion portion 238 in the insertion opening 241 shown in FIG. 4. By sliding the pulley holder 225 leftwardly in FIG. 4 (denoted by the white arrow), its engaging edges 242 are inserted in the corresponding grooves 228 with contacting each other. As the result, the pulley holder 225 is fixed to the frame 221 in the orthogonal direction with respect to the frame 221. Simultaneously, the pulley holder 225 is retained by a retainer not shown and inhibited from sliding movement to right-left direction in FIG. 2A and FIG. 2B.

When the pulley holder 225 is a molded article made of a synthetic resin, a predetermined draft angle $\phi$ is provided for ease of its removing from the cavity of the molding die. FIG. 3 is a cross sectional view taken along the line III-III of FIG. 2B, and FIG. 4 is a plan view showing the insertion opening formed in the frame.

In general, in the synthetic resin molding technique, a draft angles from 0.5° to 2° is provided. Hence, as shown in FIG. 3, the pulley holder 225 is formed in a shape inclining by the angle $\phi$ in the direction removing from the cavity of the die. As shown in FIG. 2A and FIG. 2B, since engaging sides 230 which are bottom surfaces of the grooves 228 and to which the draft angle is provided are formed along substantially the entire length of the pulley holder 225. In actuality, surface contact between the engaging edges 242 and the engaging sides 230 does not occur, and only point contact occurs therebetween. Accordingly, the known structure for supporting the pulley holder 225 may fail to ensure a sufficient strength of the pulley holder for supporting the driven pulley 224 with respect to its rotational direction, thus resulting in jerky movements of the driven pulley 224 in the rotational direction of the driven pulley 224. Such problem will interrupt the smooth circular movement of the belt and generate a positional error of the carriage during sliding, hence declining the quality of images recorded by the image recording apparatus.

BRIEF SUMMARY OF THE INVENTION

The present invention has been developed in view of the above aspects and its object is to provide a pulley holder and a structure for supporting a pulley holder that are capable of minimizing the jerky movement of a pulley holder mounted to a frame with the use of a simpler arrangement.

A structure for supporting a pulley holder according to one aspect of the present invention comprises a pulley holder for rotatably supporting a pulley around which a belt is movably wound, a frame member that slidably supports the pulley holder along the direction of stretching the belt, and an urging member that elastically urges the pulley holder in a belt tensioning direction in which the belt is tensioned. The pulley holder has a fitting portion that is stepwise formed along the belt tensioning direction; and the frame member has a fitting opening whose edge is stepwise formed corresponding to the fitting portion.

In such structure for supporting a pulley holder, since the fitting portion stepwise formed along the belt tensioning direction is fitted in the corresponding stepwise formed edge of the fitting opening, the pulley holder is supported at a plurality of points. As a result, since the strength of the pulley holder for supporting the pulley with respect to its rotational direction becomes large, the jerky movement of the pulley in the rotating direction is minimized.

In addition, a pulley holder according to another aspect of the present invention rotatably supports a pulley around which a belt is movably wound. The pulley holder comprises a fitting portion that is stepwise formed along a belt tensioning direction in which the belt is tensioned, and the fitting portion is slidably fitted to a predetermined frame member while being urged in the belt tensioning direction.

The above and further objects and features of the invention will more fully be apparent from the following detailed description with accompanying drawings.

DETAILED DESCRIPTION OF THE PRESENT INVENTION

Preferred embodiments of the present invention will be explained with reference to the drawings as needed. Note that this embodiment is only an example of the present invention, and needless to say, the embodiment can be suitably changed in a scope not departing from the spirits of the present invention.

Figure 1A:
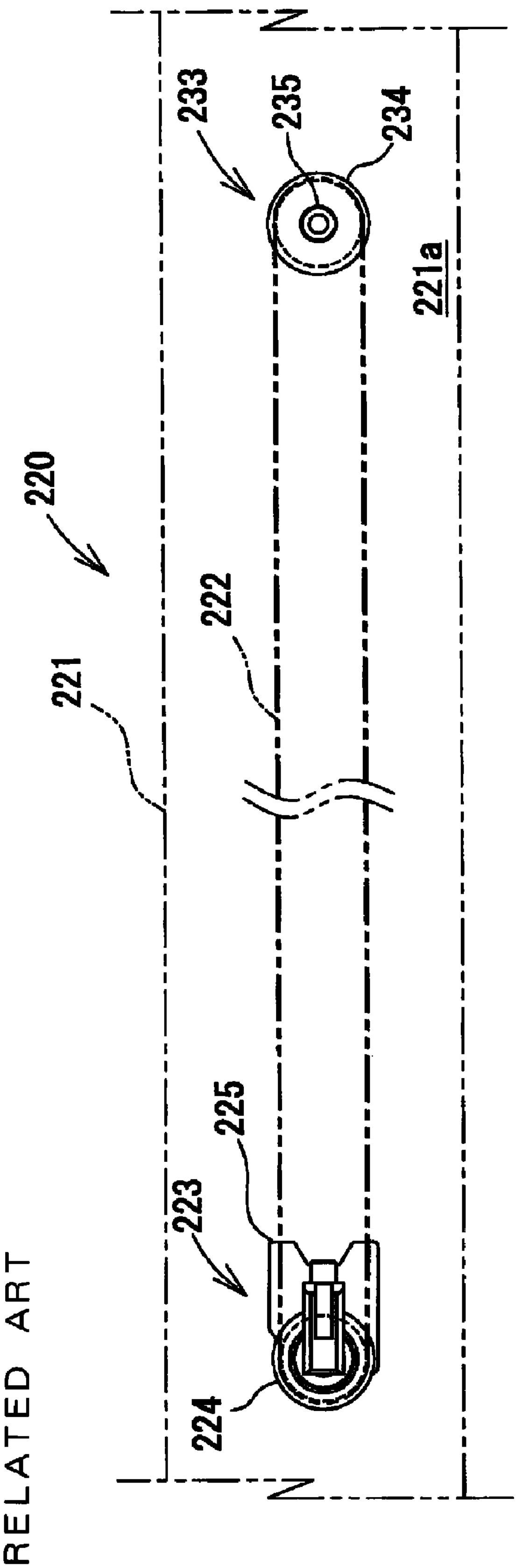
FIG. 1A RELATED ART
FIG. 1A and FIG. 1B are a plan view and a front view respectively of a known driving transmission mechanism employing pulleys.
Figure 1B:
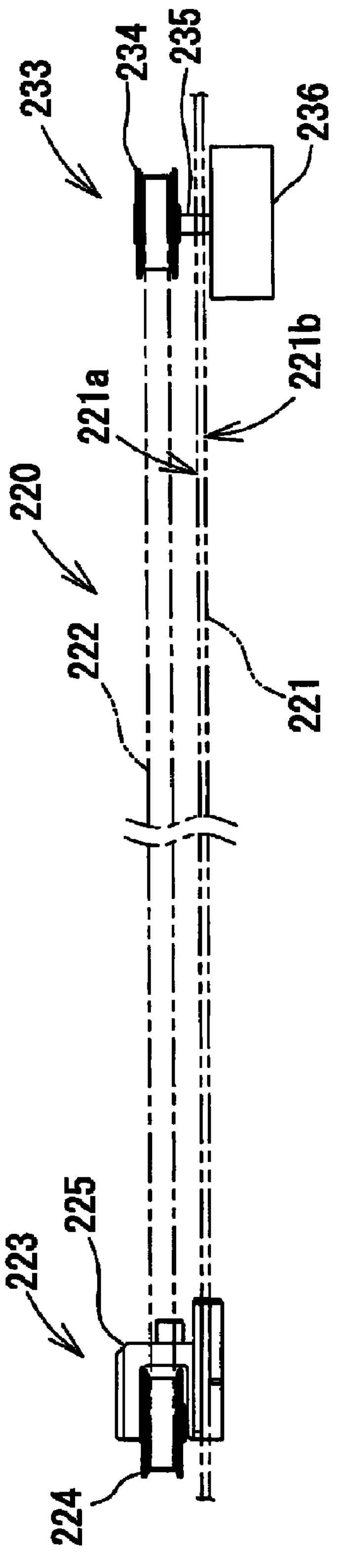
FIG. 1B RELATED ART
Figure 2A:
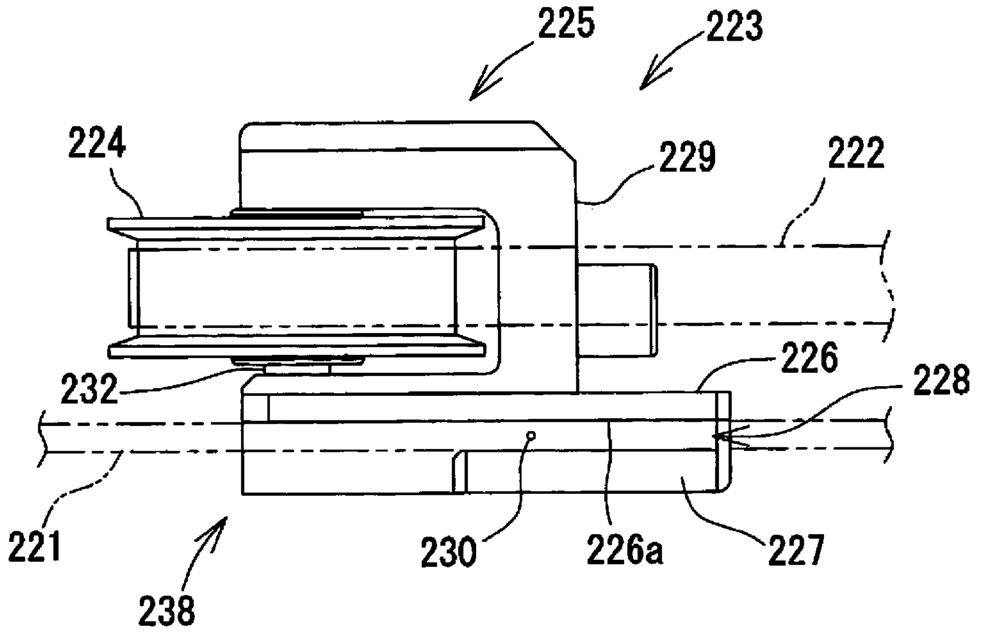
FIG. 2A RELATED ART
FIG. 2A and FIG. 2B are side views showing a driven pulley unit of the known driving transmission mechanism.
Figure 2B:
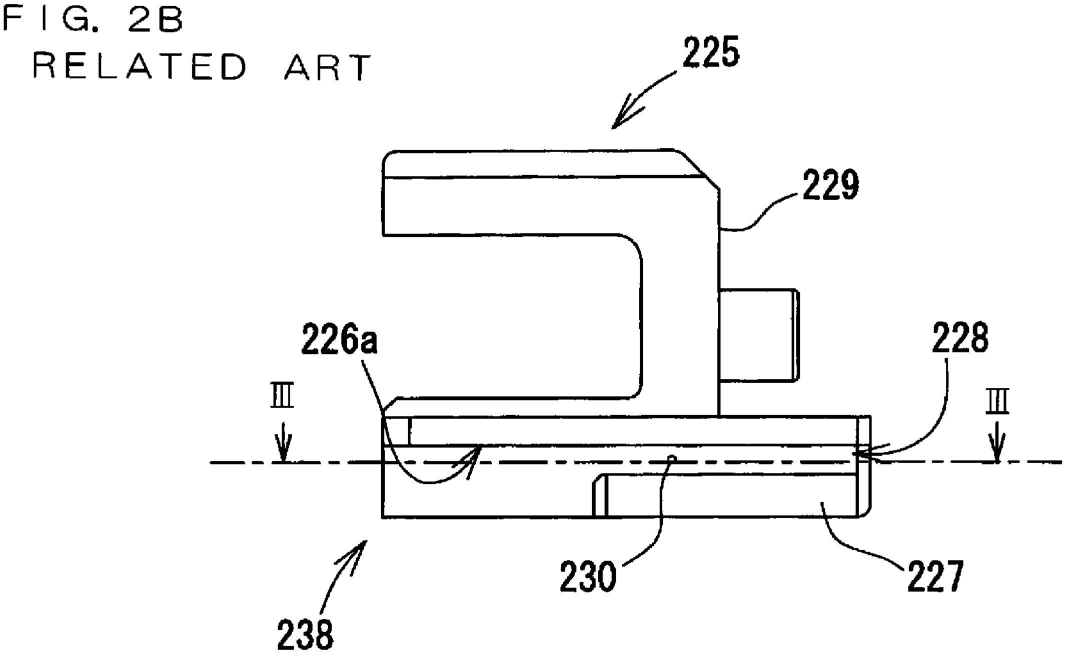
FIG. 2B RELATED ART
Figure 3:
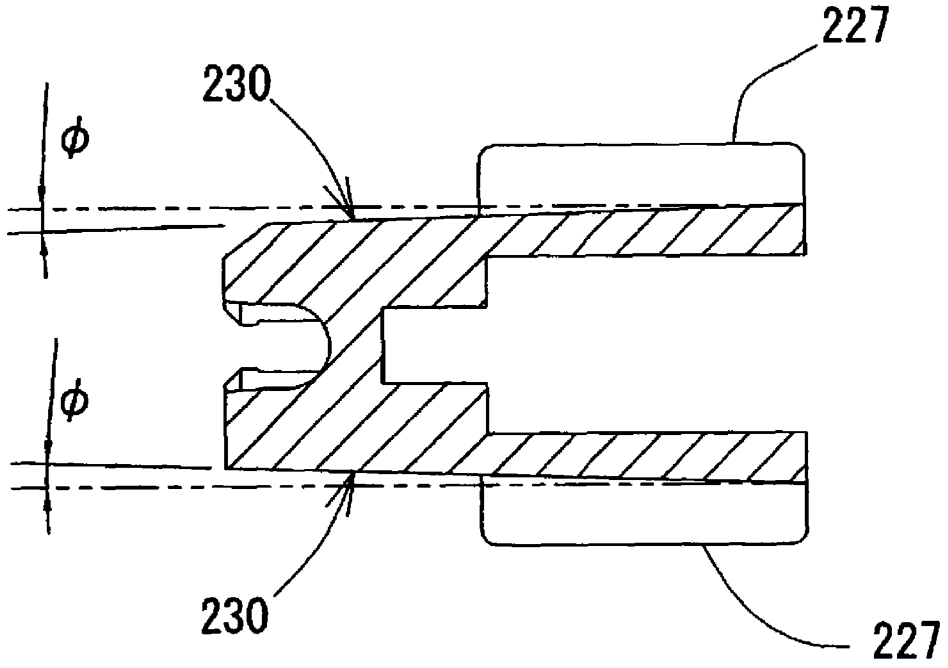
FIG. 3 RELATED ART
FIG. 3 is a cross sectional plan view taken along the line III-III in FIG. 2.
Figure 4:
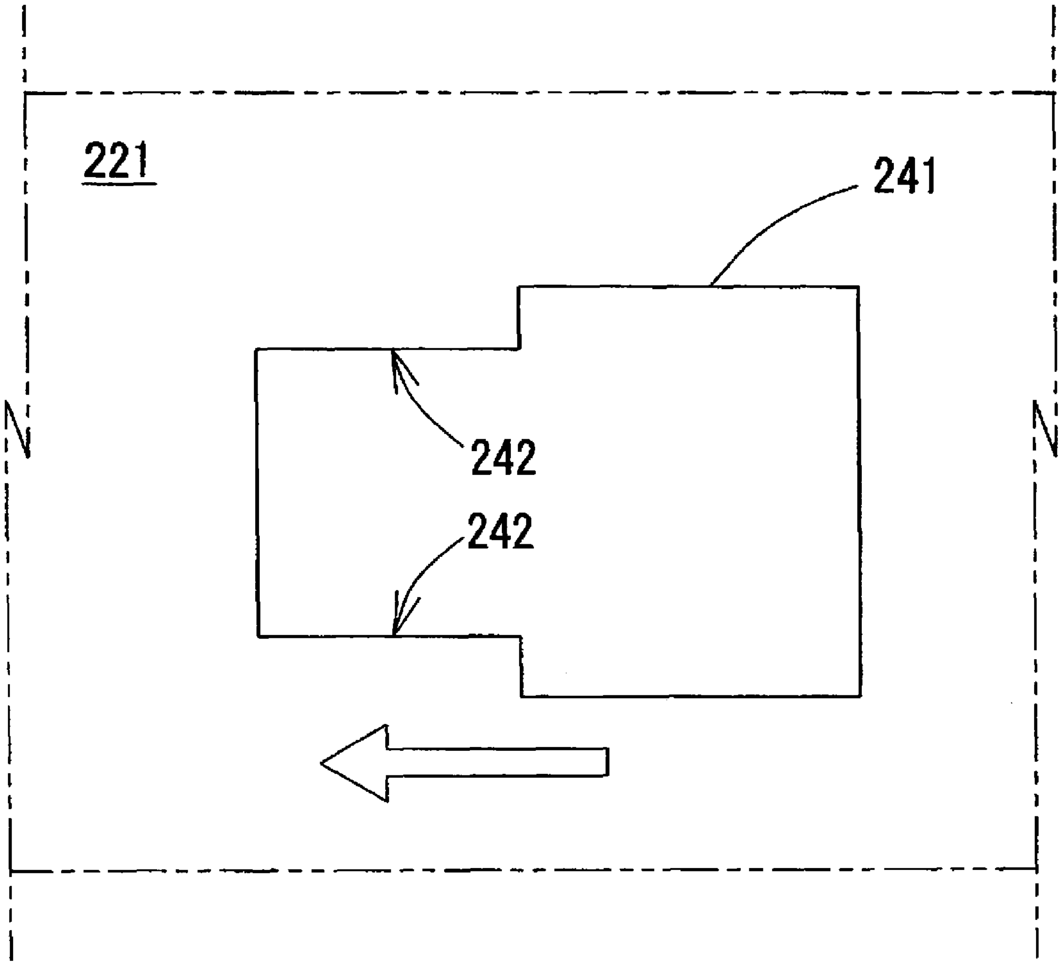
FIG. 4 RELATED ART
FIG. 4 is a plan view showing the shape of an insertion opening provided in a frame of the known driving transmission mechanism.
Figure 5:
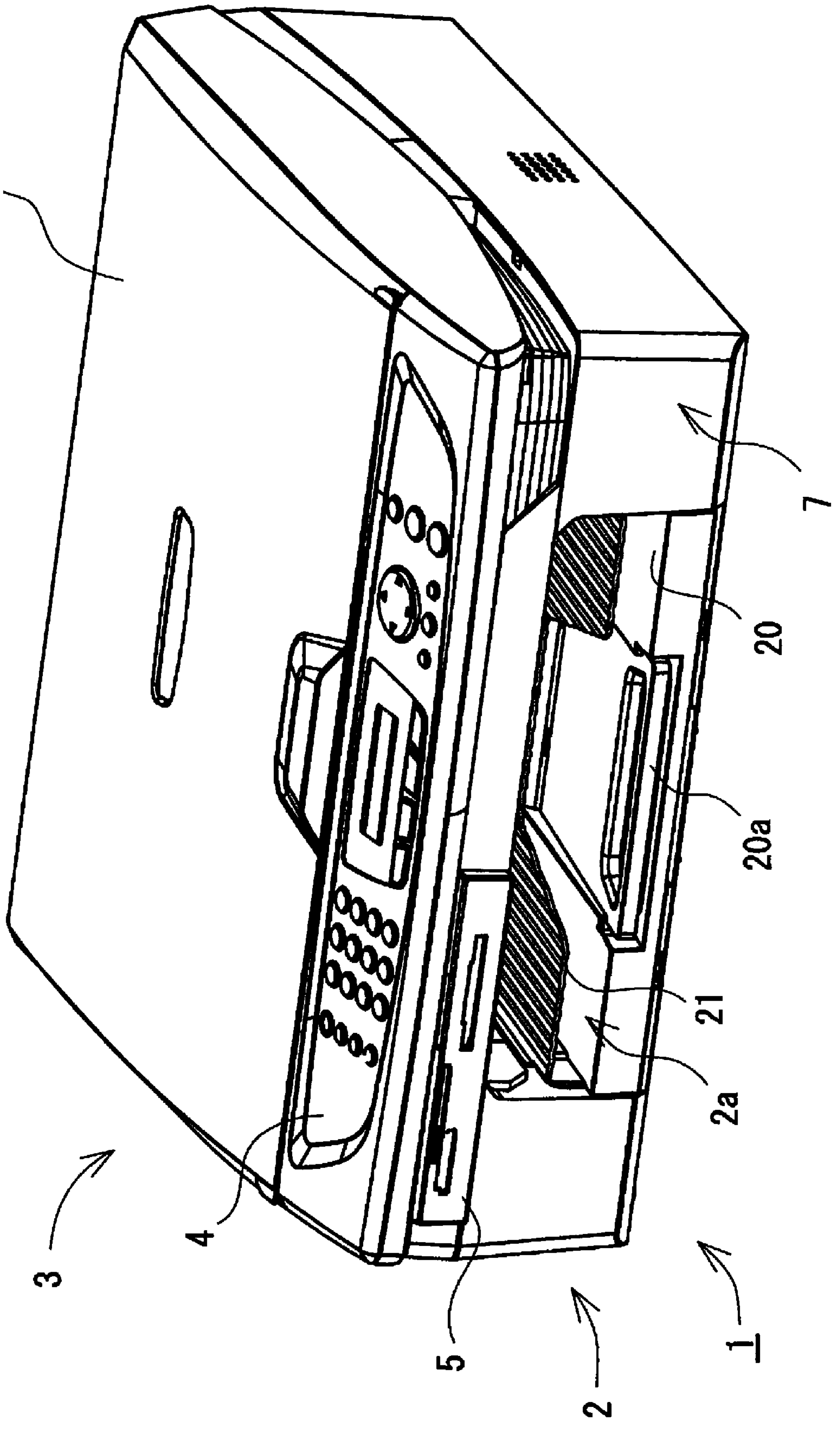
FIG. 5 is a schematic perspective view showing an external configuration of an MFD (Multi-Function Device) according to an embodiment of the present invention.
Figure 6:
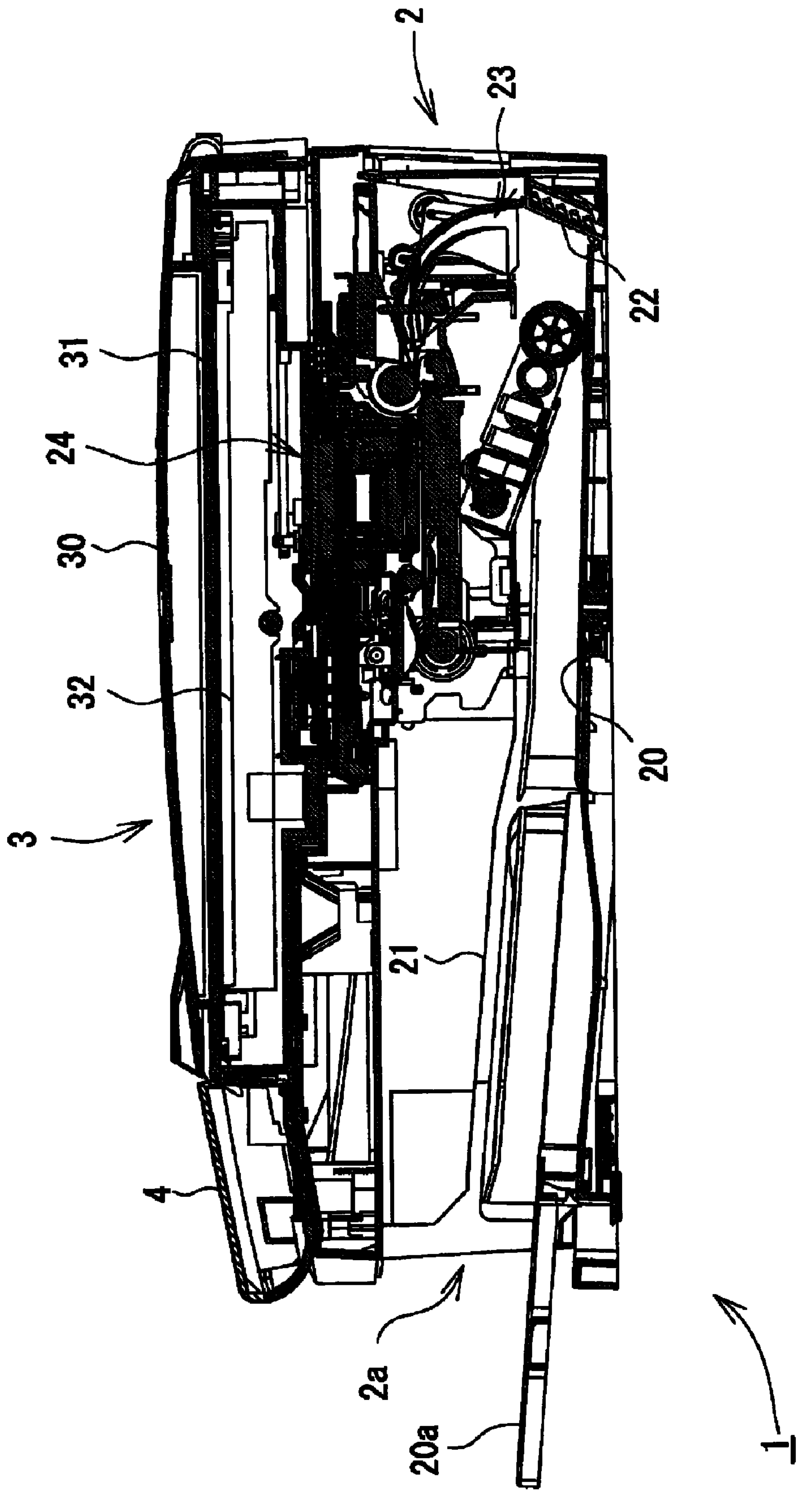
FIG. 6 is a longitudinal cross sectional view showing an internal configuration of the MFD according to the embodiment of the present invention.

FIG. 5 is a schematic perspective view showing an external configuration of an MFD (Multi-Function Device) 1 according to an embodiment of the present invention. FIG. 6 is a longitudinal cross sectional view showing an internal configuration of the MFD 1 according to an embodiment of the present invention.

An MFD 1 is integrally provided with a printer unit 2 in a lower portion and a scanner unit 3 in an upper portion thereof, and has functions such as a printer function, scanner function, copying function and a facsimile function. The printer unit 2 in the MFD 1 corresponds to an image recording apparatus. Accordingly, the function other than the printer function is optional function, and, for example, the image recording apparatus may be realized as a printer of a single function not having the scanner unit 3, and not having the scanner function or copying function.

The printer unit 2 of the MFD 1 is connected to an external information apparatus mainly such as a computer. The printer unit 2 records an image and/or document on a recording paper (recording medium), based on print data including image data and/or document data transmitted from the computer. In addition, the MFD 1 is capable of recording on the recording paper the image data outputted from a digital camera and the like when the digital camera and the like is connected thereto, and recording on the recording paper the image data and the like stored in the storage medium such as a memory card and the like when each kind of the storage medium is loaded thereto.

As shown in FIG. 5, the MFD 1 has a substantially rectangular parallelpiped outer shape, i.e. a wide and thin shape wherein a lateral width and depth are larger than a height, and the printer unit 2 is incorporated in a lower portion. An opening 2*a* is opened in a front face of the printer unit 2. A paper feed tray 20 and a paper discharge tray 21 are provided in upper and lower stages in the opening 2*a*. The recording paper as the recording medium of each kind of sizes such as the B5 size smaller than the A4 size, and post card size, is stored in the paper feed tray 20. As shown in FIG. 6, in the paper feed tray 20, a tray surface is expanded by pulling out a slide tray 20*a* as needed. In this case, for example, the recording paper of a legal size can be stored. The recording paper stored in the paper feed tray 20 is fed to an inside of the printer unit 2, thereby recording a desired image, and is discharged to the paper discharge tray 21.

The scanner unit 3 is incorporated in an upper portion of the MFD 1, and is configured as a so-called flat bed scanner. As shown in FIG. 5 and FIG. 6, a platen glass 31 and an image sensor 32 are provided below a document cover 30 which can be freely opened and closed, and is provided as a top board of the MFD 1. A document from which an image is to be read is placed on the platen glass 31. The image sensor 32 which can be reciprocally moved in a width direction of the MFD 1 (direction vertical to a paper surface of FIG. 6), with a depth direction of the MFD 1 (right-left direction of FIG. 6) set as a main scanning direction is provided below the platen glass 31.

An operation panel 4 for operating the printer unit 2 or the scanner unit 3 is provided at a front upper portion of the MFD 1. The operation panel 4 is composed of each kind of operation button and a liquid crystal display. The MFD 1 is operated based on an operation instruction given from the operation panel 4. When the MFD 1 is connected to the external computer, the MFD 1 is also operated based on an instruction transmitted from the computer through a printer driver or a scanner driver. A slot unit 5 is provided at a front upper left portion of the MFD 1. Each kind of small-sized memory card as the storage medium can be loaded in the slot unit 5. When a user performs a predetermined operation to the operation panel 4, the image data stored in the small-sized memory card loaded in the slot unit 5 is read. Information relating to the image data thus read is displayed on the liquid crystal display of the operation panel 4, and therefore based on this display, the user can record a desired image on the recording paper by the printer unit 2.

Hereunder, an explanation is given to an internal configuration of the MFD 1, particularly the configuration of the printer unit 2, with reference to FIG. 5 to FIG. 14.

As shown in FIG. 6, the paper feed tray 20 is provided on the bottom side of the MFD 1. A separation tilting plate 22 is provided in a depth side of the paper feed tray 20. The separation tilting plate 22 separates the recording papers sent from the paper feed tray 20 in a mutually overlapped state, and guides upward only the uppermost recording paper. A paper conveying path 23 runs upward from the separation tilting plate 22, and is curved toward the front side of the MFD 1. Namely, the paper conveying path 23 runs from a backside to a front side of the MFD 1, and leads to the paper discharge tray 21 through an image recording unit 24. Accordingly, the recording paper stored in the paper feed tray 20 is guided by the paper conveying path 23 so as to make a U-turn upward from below, and reaches the image recording unit 24. Then, the recording paper already recorded the image thereon by the image recording unit 24 is discharged to the paper discharge tray 21.

Figure 7:
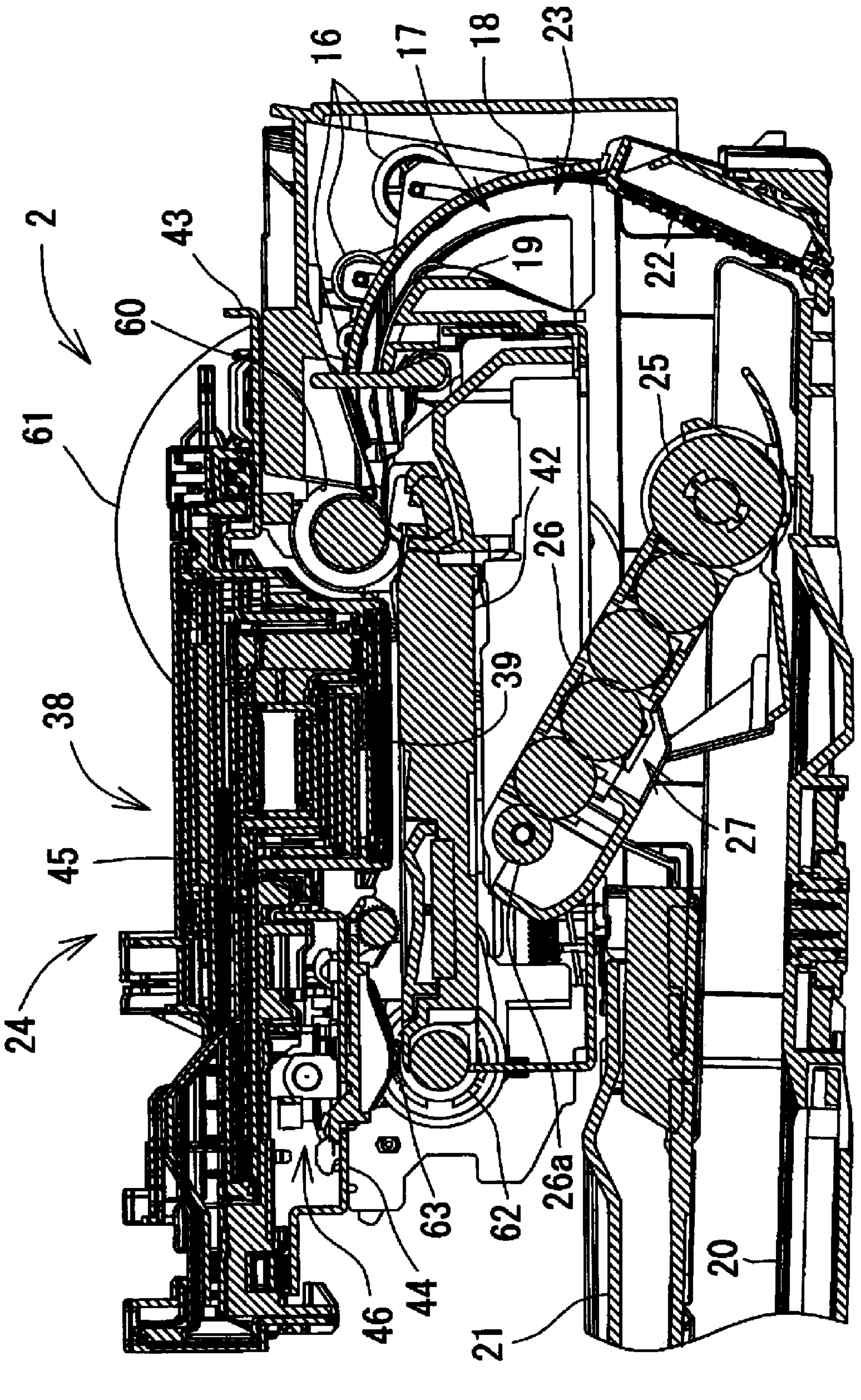
FIG. 7 is a partially enlarged cross sectional view showing an essential portion of a printer unit of the MFD according to the embodiment of the present invention.
Figure 8:
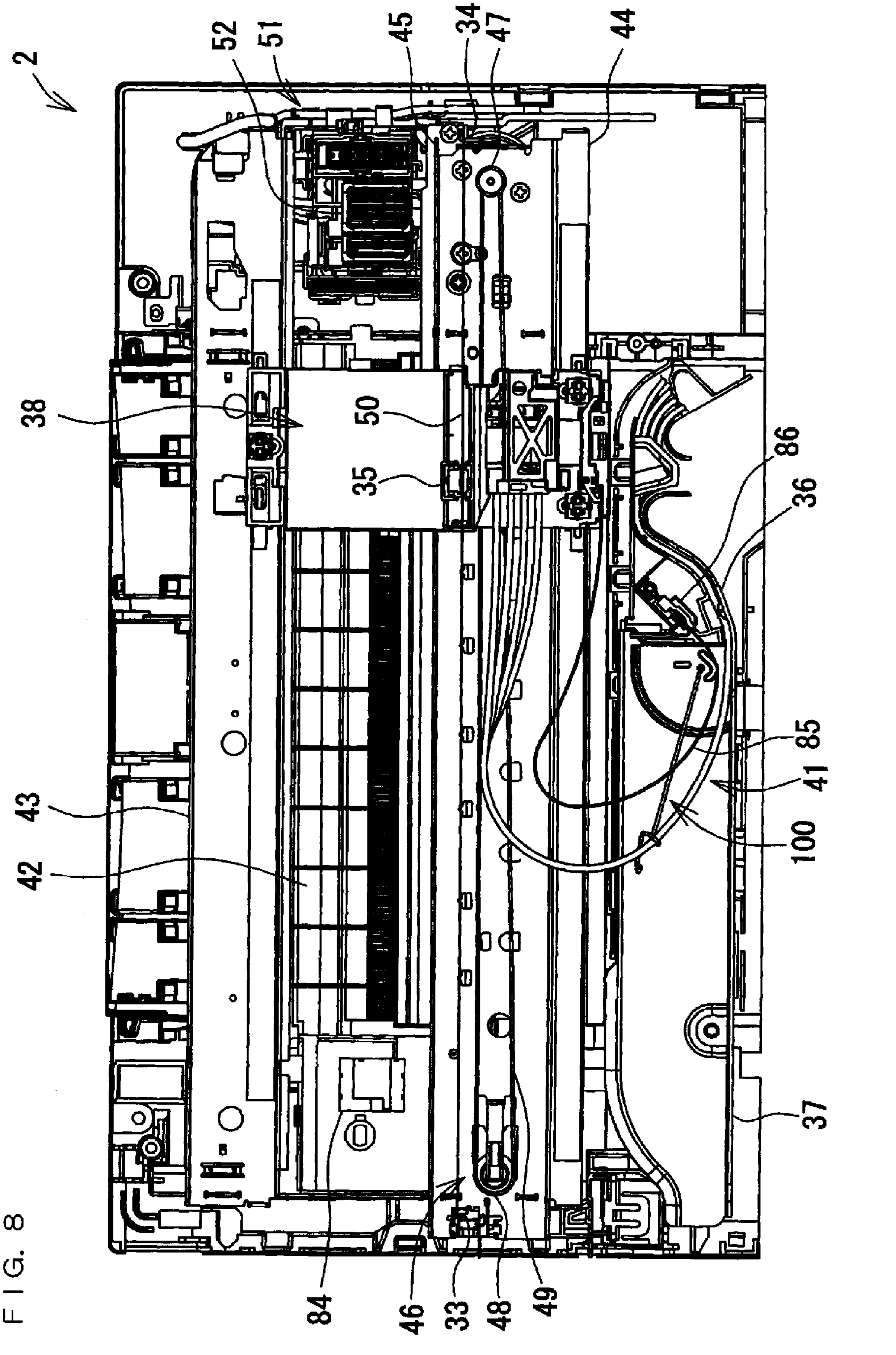
FIG. 8 is a plan view showing an essential portion of a printer unit of the MFD according to the embodiment of the present invention.

FIG. 7 is a partially enlarged cross sectional view showing an essential portion of a printer unit of the MFD according to the embodiment of the present invention. FIG. 8 is a plan view showing an essential portion of the printer unit of the MFD 1 according to the embodiment of the present invention, mainly showing a configuration from approximately the center of the printer unit 2 to the backside of the apparatus.

As shown in FIG. 7, a paper feed roller 25 for feeding the recording paper placed on the paper feed tray 20 to the paper conveying path 23 is provided above the paper feed tray 20. The paper feed roller 25 is pivotally supported by a tip end of a paper feed arm 26. The paper feed roller 25 is rotated by transmitting driving force of an LF motor 71 described below (See FIG. 14) through a driving force transmission mechanism 27 configured by meshing a plurality of gears.

The paper feed arm 26 is provided so as to make a base shaft 26*a* thereof as a rotary shaft. By rotating with the base shaft 26*a* as a rotation center, the paper feed arm 26 moves vertically so as to be brought into contact with and separated from the paper feed tray 20. As shown in FIG. 7, the paper feed arm 26 comes into contact with the paper feed tray 20 by its own weight or by being urged with a spring or the like so as to move rotationally to the downside. However, when the paper feed tray 20 is inserted into or pulled out, the paper feed arm 26 can retreat to the upside. By a rotational movement of the paper feed arm 26 to the downside, the paper feed roller 25 pivotally supported to the tip end of the paper feed arm 26 is brought into a pressure contact with the recording paper on the paper feed tray 20. In this state, when the paper feed roller 25 is rotated, by a frictional force between a roller surface of the paper feed roller 25 and the recording paper, the uppermost recording paper is sent to the separation tilting plate 22. The recording paper is guided upward, with its front end come into contact with the separation tilting plate 22, and is sent into the paper conveying path 23. When the uppermost recording paper is sent by the paper feed roller 25, the recording paper just thereunder is sometimes sent accordingly by an action of a friction or static electricity (sent in a mutually overlapped state). However, the recording paper thus sent in a mutually overlapped state is restrained by making contact with the separation tilting plate 22, thus sending only the uppermost recording paper.

The paper conveying path 23 is composed of an outside guide surface and an inside guide surface facing each other with a predetermined distance, other than a portion in which the image recording unit 24 and the like is disposed. For example, a curved portion 17 of the paper conveying path 23 on the backside of the MFD 1 is configured by fixing an outside guide member 18 and an inside guide member 19 to a body frame. On the paper conveying path 23, particularly at a portion where the paper conveying path 23 is curved, rollers 16 whose axial directions are made to be a width direction of the paper conveying path 23 are rotatably provided, so that surfaces of the rollers are exposed to the outside guide surface. By each roller 16, the recording paper is smoothly conveyed in a slide contact with a guide surface even in the portion where the paper conveying path 23 is curved.

As shown in FIG. 6, the image recording unit 24 is provided on the paper conveying path 23. As shown in FIG. 7, the image recording unit 24 comprises a carriage 38 carrying thereon an ink jet recording head 39 (See FIG. 9) reciprocating in the main scanning direction. To the ink jet recording head 39, each color ink such as cyan (C), magenta (M), yellow (Y), and black (Bk) is supplied from each ink cartridge disposed in the MFD 1 independently of the ink jet recording head 39 through each ink tube 41 (See FIG. 8). During the reciprocating motion of the carriage 38 by selectively ejecting each color ink from the ink jet recording head 39 as minute ink droplets, an image is recorded on the recording paper conveyed on a platen 42. Note that the ink cartridge is not shown in FIG. 7 and FIG. 8.

Figure 9:
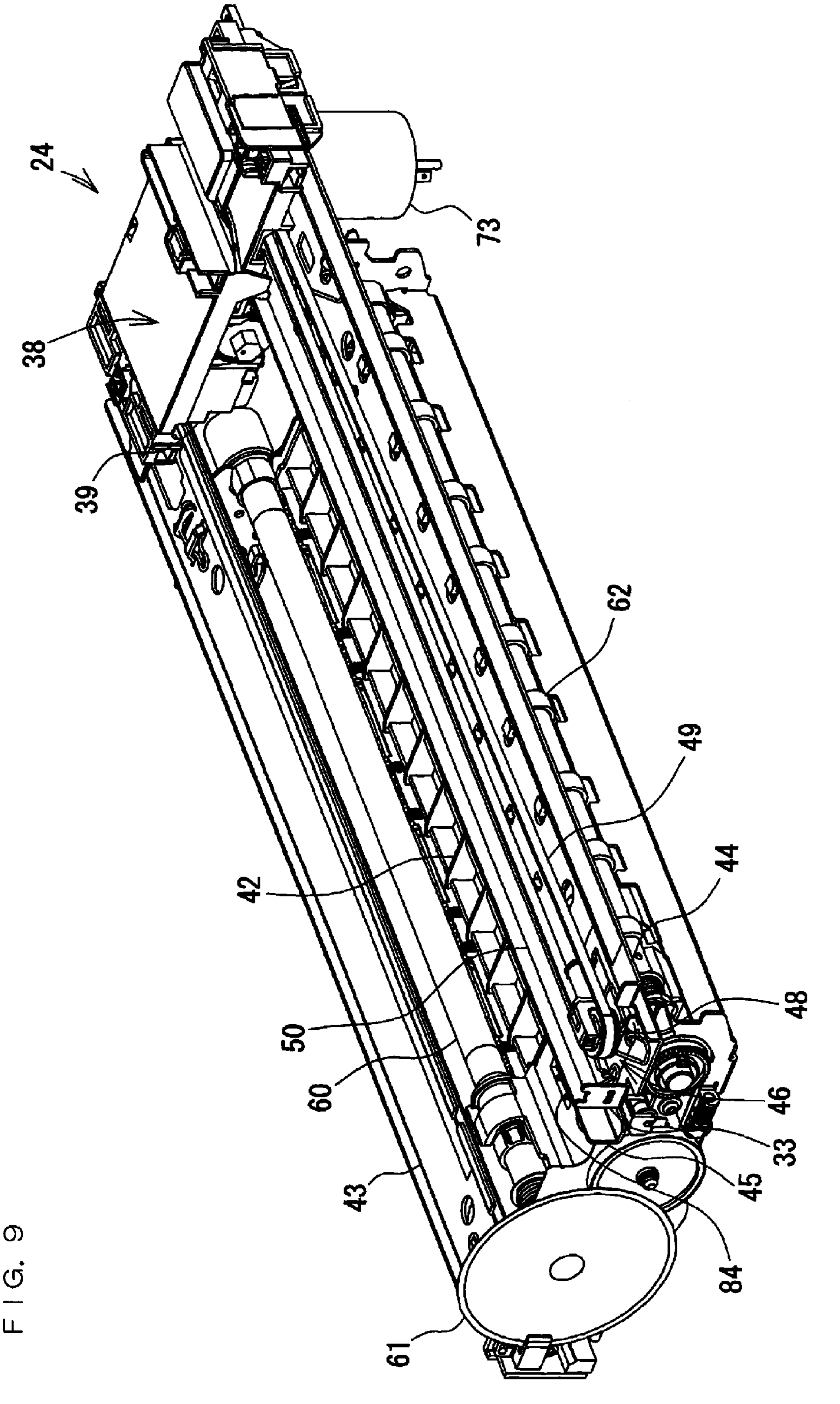
FIG. 9 is a schematic perspective view showing a mechanism in an image recording unit of the MFD according to the embodiment of the present invention.

FIG. 8 is a plan view showing an essential portion of the printer unit 2, mainly showing a configuration from approximately the center of the printer unit 2 to the backside of the. FIG. 9 is a schematic perspective view showing a mechanism about an image recording unit 24 of the MFD 1 according to the embodiment of the present invention. Note that, in FIG. 9, the ink tubes 41 and the flat cable 85 are omitted.

As shown in FIG. 8 and FIG. 9, above the paper conveying path 23, a pair of guide rails 43 and 44 are extended in a direction (right-left direction in FIG. 8) crossing the conveying direction of the recording paper (hereunder called as a paper conveying direction), while being separated at a predetermined distance in the paper conveying direction (direction from upside to downside in FIG. 8). Note that in this embodiment, the direction of the pair of guide rails 43 and 44 crossing the paper conveying direction corresponds to a substantially orthogonal direction, and therefore an explanation is given hereunder that the pair of guide rails 43 and 44 are orthogonal to the paper conveying direction.

The guide rails 43 and 44 are provided in a casing of the printer unit 2, and constitute a part of a frame for supporting each member constituting the printer unit 2. The carriage 38 is placed slidably in the direction orthogonal to the paper conveying direction in a manner of bridging over the guide rails 43 and 44. Thus, by arranging the guide rails 43 and 44 side by side almost in parallel to the surface of the recording paper, at separated positions in the paper conveying direction, a height of the printer unit 2 is lessened, thus making it possible to form the apparatus thinner.

The guide rail 43 disposed on an upstream side in the paper conveying direction is a plate like member whose length in a width direction (right-left direction in FIG. 8) of the paper conveying path 23 is longer than a reciprocating range of the carriage 38. The guide rail 44 disposed on a downstream side in the paper conveying direction is the plate like member whose length in the width direction of the paper conveying path 23 is almost the same as the length of the guide rail 43. An end portion of the carriage 38 on the upstream side of the paper conveying direction is placed on the guide rail 43, and an end portion of the same on the downstream side in the paper conveying direction is placed on the guide rail 44. Accordingly, the carriage 38 can slidably move in a longitudinal direction of the guide rails 43 and 44. As shown in FIG. 7, an edge portion 45 of the guide rail 44 on the upstream side in the paper conveying direction is bent approximately at right angle upward. The carriage 38 carried on the guide rails 43 and 44 slidably pinches the edge portion 45 of the guide rail 44 by a pinching member such as a pair of rollers. Thus, the carriage 38 is positioned in the paper conveying direction, and can slide in a direction orthogonal to the paper conveying direction. Namely, the carriage 38 is slidably carried on the guide rails 43 and 44, and reciprocates in the direction orthogonal to the paper conveying direction while being positioned by the edge portion 45 of the guide rail 44 as a reference. In addition, although not shown not shown in FIG. 7 and FIG. 8, a lubricant agent such as grease is applied to the edge portion 45 so that the carriage 38 can smoothly slide.

A belt driving mechanism 46 is disposed on the upper surface of the guide rail 44. The belt driving mechanism 46 is so constituted that an endless circular timing belt 49 (corresponding to a belt of the present invention) having teeth on its inside is wound between a driving pulley 47 and a driven pulley 48 each being provided on the guide rail 44 at both end portions in the width direction of the paper conveying path 23. A driving force is inputted in a shaft of the driving pulley 47 from a CR motor 73 (See FIG. 14) described later. Accordingly, by a driving force from the CR motor 73, the driving pulley 47 is rotated, and the timing belt 49 carries out circular motion. Note that the timing belt 49 is not limited to the endless circular type, but may be constituted so as to firmly fix both end portions of a limited-length belt to the carriage 38.

Figure 10:
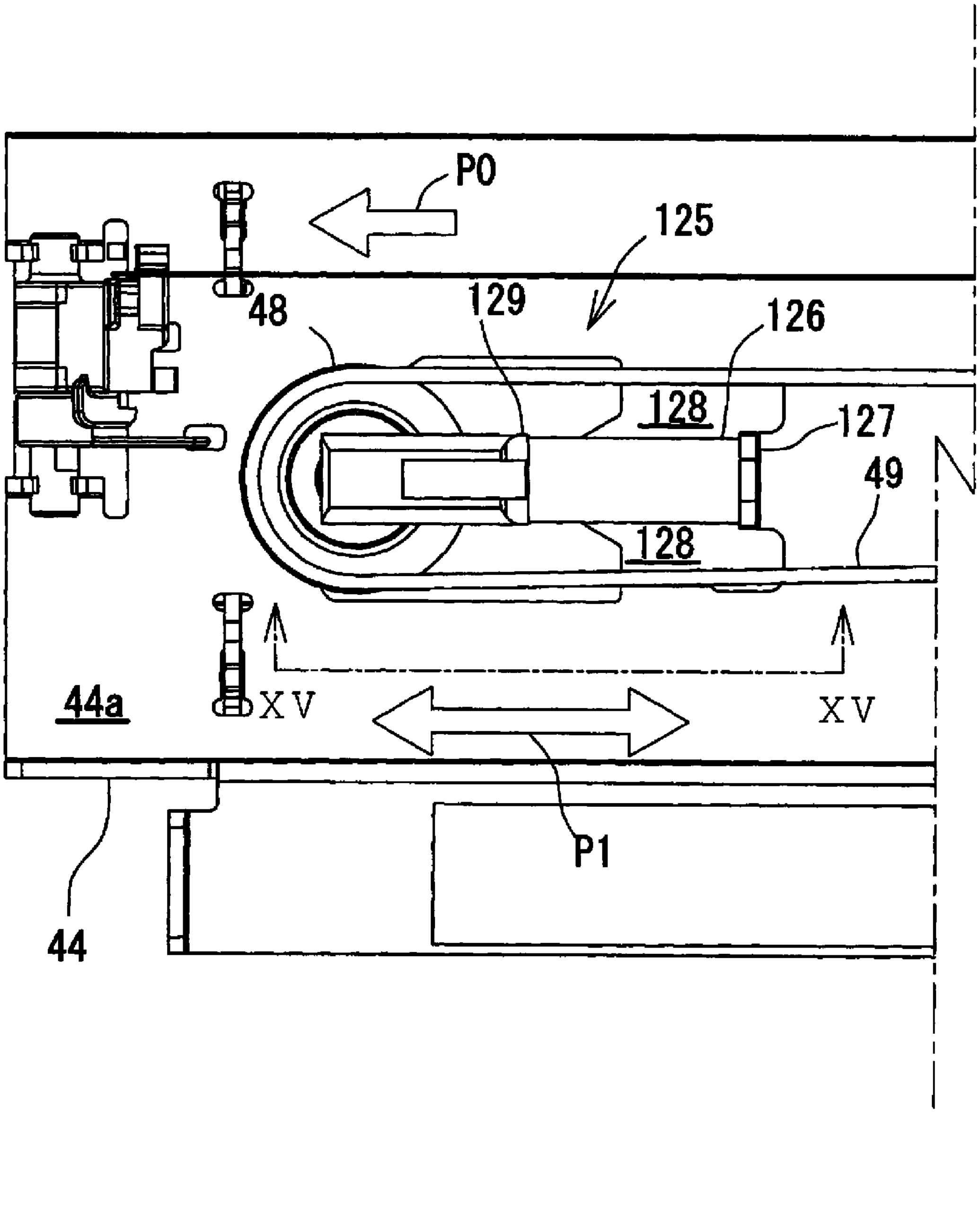
FIG. 10 is a schematic enlarged view showing an arrangement about a driven pulley in the pulley holder and the structure for supporting a pulley holder according to the embodiment of the present invention.
Figure 11:
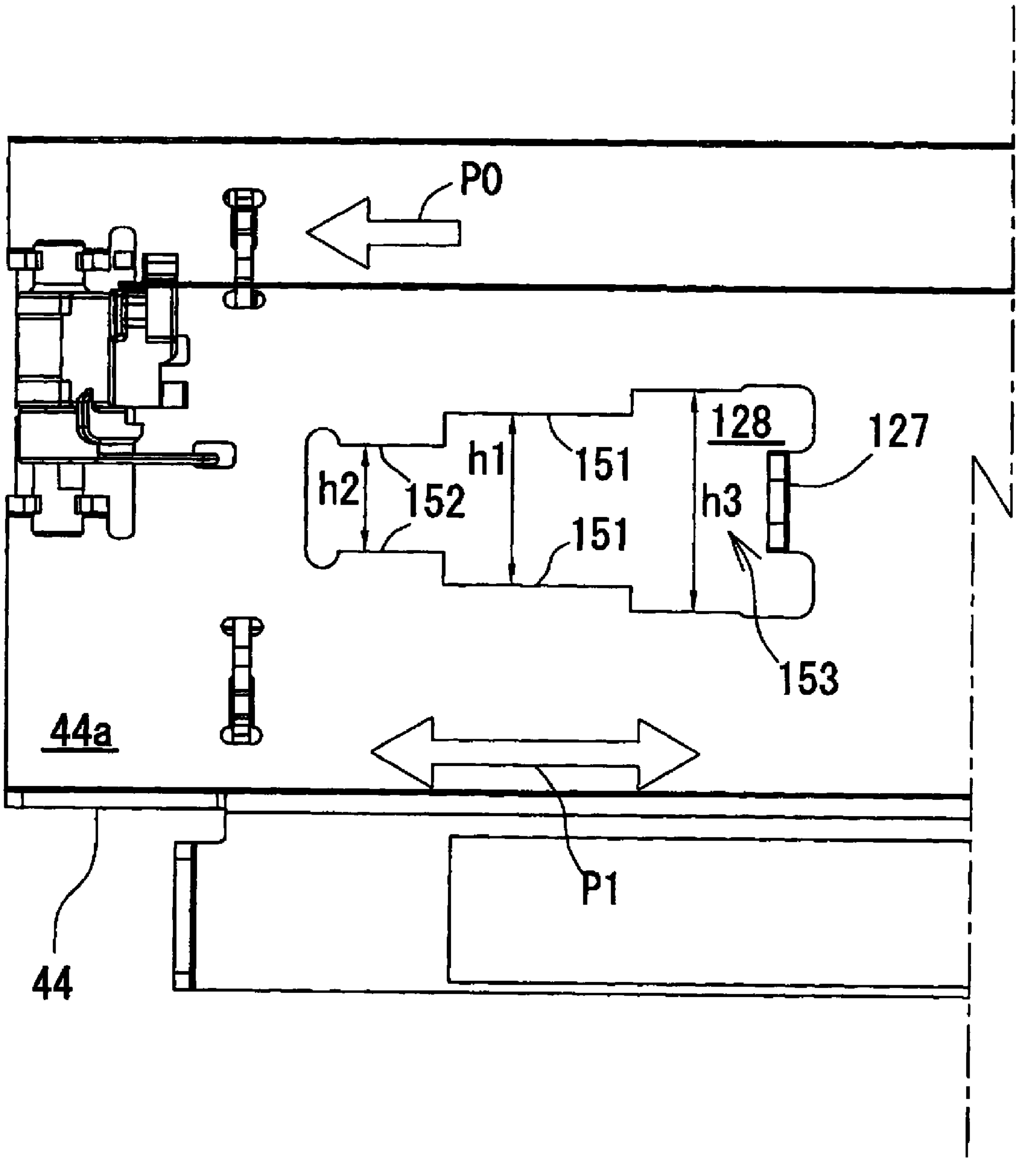
FIG. 11 is a plan view showing a configuration of a holder fitting opening in the structure for supporting a pulley holder according to the embodiment of the present invention.

FIG. 10 is a schematic enlarged view showing an arrangement of a structure for supporting the pulley holder and an environs around a driven pulley of a pulley holder according to the embodiment of the present invention. FIG. 11 is a plan view showing a configuration of a holder fitting opening of the structure for supporting the pulley holder according to the embodiment of the present invention.

As shown in FIG. 10, the driven pulley 48 is rotatably supported by a pulley holder 125 which is mounted on a guide rail 44. At the guide rail 44, a holder fitting opening 128 is formed (opened) as shown in FIG. 10 and FIG. 11. The holder fitting opening 128 is used for fixing the pulley holder 125 to the guide rail 44. An upright plate 127 is mounted vertically on an upper surface 44*a* of the guide rail 44. The upright plate 127 is a bracket for elastically urging the pulley holder 125, which can move in both directions (both directions of an arrow P1 in FIG. 10) for stretching the timing belt 49, in a direction of tensioning the timing belt 49 by a coil spring 126 functioning as an urging member.

The holder fitting opening 128 opened in the guide rail 44 supports the pulley holder 125 slidably in the both directions of the arrow P1. More particularly, when a lower half portion 131 (See FIG. 15B) of the pulley holder 125 is inserted into the holder fitting opening 128 and when the pulley holder 125 is slid in the belt tension direction, that is, a direction of an arrow P0 (leftward in FIG. 10), first and second fitting portions 161 and 162 (See FIG. 15A and FIG. 15B), described later, provided in the pulley holder 125 come into engagement with first and second edge portions 151 and 152 (See FIG. 11) of the holder fitting opening 128, respectively. Then, by inserting a coil spring 126 being compressed state between a spring receiver 129 provided on the pulley holder 125 and the upright plate 127 provided on the guide rail 44, the pulley holder 125 is fixed to the guide rail 44. In addition, a shape of the holder fitting opening 128 opened in the guide rail 44 and a supporting construction of the pulley holder 125 in the guide rail 44 will be described later in more detail.

At the bottom side, the carriage 38 is firmly secured to the timing belt 49. Accordingly, in accordance with a circular motion of the timing belt 49, the carriage 38 reciprocates on the guide rails 43 and 44, with the edge portion 45 as a reference. Since the ink jet recording head 39 is mounted on such a carriage 38, as a result, the ink jet recording head 39 reciprocates, in the width direction of the paper conveying path 23 as the main scanning direction.

An encoder strip 50 of a linear encoder 77 (See FIG. 14) is disposed in the guide rail 44. The encoder strip 50 is a strip member composed of a transparent resin. A pair of support portions 33 and 34 are formed on both end portions of the guide rail 44 in the width direction (reciprocating direction of the carriage 38), so as to stand upright from the upper surface of the guide rail 44. The encoder strip 50 is laid out over along the edge portion 45 in a state where the both end portions thereof are engaged with the support portions 33 and 34, respectively. Note that although not shown, a plate spring is provided at one of the support portions 33 and 34, and by this plate spring, an end portion of the encoder strip 50 is engaged. This plate spring prevents slacking of the encoder strip 50 by acting a tensile force on the encoder strip 50 in the longitudinal direction. When an external force acts on the encoder strip 50, the encoder strip 50 flexes by elastically deforming of the plate spring.

The encoder strip 50 is formed with a pattern in which a light transmitting portion for transmitting light and a light shielding portion for intercepting light are alternately arranged in the longitudinal direction at a predetermined pitch. At a position corresponding to the encoder strip 50 on the upper surface of the carriage 38, an optical sensor 35, which is a transmission type sensor, is provided. The optical sensor 35 reciprocates along the longitudinal direction of the encoder strip 50 together with the carriage 38, and detects the pattern of the encoder strip 50 during reciprocating motion. On the ink jet recording head 39, a head control substrate for controlling ejecting of the ink is provided. The head control substrate outputs a pulse signal based on a detection signal of the optical sensor 35, and based on the pulse signal thus outputted, the position of the carriage 38 is determined and the reciprocating motion of the carriage 38 is controlled. Note that in FIG. 8 and FIG. 9, since the head control substrate is covered with a head cover of the carriage 38, it is not shown.

As shown in FIG. 8 and FIG. 9, the platen 42 is disposed on the lower side of the paper conveying path 23 facing the ink jet recording head 39. The platen 42 is disposed covering the center portion where the recording paper passing within a range of reciprocating motion of the carriage 38. A width of the platen 42 is sufficiently larger than a maximum width of the recording paper that can be conveyed. Therefore, both side edges of the recording paper always pass over the platen 42.

As shown in FIG. 8 and FIG. 9, in a range where the recording paper does not pass, that is, outside an image recording range by the ink jet recording head 39, maintenance units such as a purge mechanism 51, a waste ink tray 84 and the like are disposed. The purge mechanism 51 sucks and removes bubble and/or foreign materials from nozzles 53 (See FIG. 12) of the ink jet recording head 39. The purge mechanism 51 is composed of a cap 52 covering the nozzles 53 of the ink jet recording head 39, a pump mechanism connected to the ink jet recording head 39 through the cap 52, and a moving mechanism for making the cap 52 come into contact with or separated from the nozzles 53 of the ink jet recording head 39. Note that in FIG. 8 and FIG. 9, the pump mechanism and the moving mechanism are located below the guide rail 44, and therefore they are not shown in the figure. At the time of suction and removal of the bubble and the like from the ink jet recording head 39, the carriage 38 moves so that the ink jet recording head 39 is located above the cap 52. In this state, the cap 52 moves upward so as to seal the nozzles 53 on the lower surface of the ink jet recording head 39, and is glued thereto. By making the inside of the cap 52 be a negative pressure by the pump mechanism, the ink is sucked from the nozzles 53 of the ink jet recording head 39. The bubble and foreign materials in the nozzles 53 are sucked and removed together with the ink.

The waste ink tray 84 is provided for receiving the ink that is idly ejected from the ink jet recording head 39, which is called flushing. The waste ink tray 84 is formed on the upper surface of the platen 42, in the range of the reciprocating motion of the carriage 38, and outside the image recording range. Note that a felt is laid down in the waste ink tray 84. The flushed ink is sucked into this felt and held thereon. By these maintenance units, maintenance such as a removal of the bubble and mixed color ink in the ink jet recording head 39 and drying prevention is performed.

As shown in FIG. 5, a door 7 is provided on the front surface of the casing of the printer unit 2 so as to be freely opened. When the door 7 is opened, a cartridge receiving portion is exposed on the front side of the apparatus, so that the ink cartridge can be inserted thereinto and pulled out therefrom. The cartridge receiving portion is, although not shown, divided into four container chambers corresponding to the ink cartridge, and each container chamber contains the ink cartridge storing each color ink of cyan, magenta, yellow, and black. As shown in FIG. 8, four ink tubes 41 corresponding to each color are laid out to the carriage 38 from the cartridge receiving portion. To the ink jet recording head 39 mounted on the carriage 38, each color ink is supplied from the ink cartridge attached to the cartridge receiving portion, through each ink tube 41.

Each ink tube 41 is made of synthetic resin, and has flexibility of easily flexing by sufficiently following the reciprocating motion of the carriage 38. Each ink tube 41 led from the cartridge receiving portion is pulled out up to the vicinity of the center portion along the width direction (right-left direction) of the apparatus, and fixed to a fixing portion of the apparatus body. Specifically, a fixing clip 36 is fixed to the apparatus body, and by this fixing clip 36, each ink tube 41 is fixed to the apparatus body once. Each ink tube 41 has, between a portion fixed by the fixing clip 36 and a portion connected to the carriage 38, a portion not fixed to the apparatus body, and thus can be freely flexed. Such a portion of each ink tube 41 capable of freely flexing changes the posture, specifically, is curved while freely changing a curvature by following the reciprocating motion of the carriage 38. Note that in FIG. 8, the ink tube s41 extending from the portion fixed by the fixing clip 36 toward the cartridge receiving portion of the apparatus body are omitted.

As shown in FIG. 8, the ink tubes 41 are laid out, so that the portion from the fixing clip 36 to the carriage 38 forms a curved portion reversing from one direction to the other along a reciprocating direction of the carriage 38. In other words, the ink tubes 41 are laid out so that an intermediate portion in plan view forms an approximately a U-shape. Four ink tubes 41 are arranged in a lateral direction along the paper conveying direction with respect to the carriage 38, more specifically, arranged in a direction parallel to the paper conveying direction and to the reciprocating direction of the carriage 38 (in a substantially horizontal direction when the apparatus body is set on a horizontal plane), and are extended to one of the reciprocating direction of the carriage 38.

Meanwhile, at the fixing clip 36, the four ink tubes 41 are fixed while being arranged in a state of being stacked in a vertical direction (when the apparatus body is set on the horizontal plane, in a direction substantially perpendicular to the horizontal direction). The fixing clip 36 is a member with upwardly opened section formed into a U-shape, and by inserting each ink tube 41 downward from upside of the opening, the four ink tubes 41 stacked in the vertical direction are integrally pinched by the fixing clip 36. Namely, the four ink tubes 41 are curved as an integral body into an approximately U-shape in plan view of the four ink tubes 41, while being mutually twisted so that the arrangement in the lateral direction changes to the arrangement in the vertical direction in the intermediate portion, from the carriage 38 toward the fixing clip 36. As a result, on the side of the carriage 38, space-saving above the carriage 38 is attained, and on the side of the fixing clip 36 of the apparatus body, space-saving in the paper conveying direction is attained.

Signals for recording and the like are transmitted to a head control substrate of the ink jet recording head 39 from a main substrate constituting a control unit 64 (See FIG. 14) through a flat cable 85. Note that the main cable is disposed on the front side of the apparatus (on the front side in FIG. 8), but is not shown in FIG. 8. The flat cable 85 is a thin band-shaped cable insulated by covering a plurality of conductive wires for transmitting an electric signal with a synthetic resin film such as polyester film, and electrically connects the main substrate (not shown) and the head control substrate.

The flat cable 85 has a flexibility so as to sufficiently follow the reciprocating motion of the carriage 38. As shown in FIG. 8, the flat cable 85 is laid out, so that the portion from a connection portion to the carriage 38 to the portion fixed by the fixing clip 86 secured to the apparatus body can form the curved portion for reversing from one direction to the other along the reciprocating direction of the carriage 38. In other words, the flat cable 85 is laid out so as to form approximately a U-shape in plan view, with a front and rear surfaces of the thin band-shape set as the vertical direction. Namely, perpendicular lines to the front and rear surfaces of the flat cable 85 are directed to the lateral direction, and the front and rear surfaces extend in the vertical direction. Also, the direction of extending the flat cable 85 from the carriage 38 and the direction of extending the ink tubes 41 from the carriage 38 are the same direction along the reciprocating direction of the carriage 38.

One end side of the flat cable 85 fixed to the carriage 38 is electrically connected to the head control substrate mounted on the carriage 38. The other end side of the flat cable 85 fixed to the fixing clip 86 is further extended and electrically connected to the main substrate. The portion where the flat cable 85 is curved in an approximately U-shape is fixed to none of the members, and in the same way as the ink tubes 41, the posture change occurs by following the reciprocating motion of the carriage 38. The ink tubes 41 and the flat cable 85 that thus change posture by following the reciprocating motion of the carriage 38 are supported by a rotating support member 100, so as not to hang downward.

The rotating support member 100 supports the ink tubes 41 and the flat cable 85 by rotating in approximately horizontal direction following the change of posture of the ink tubes 41 and the flat cable 85.

On the front side of the apparatus of the ink tubes 41 and the flat cable 85, the regulating wall 37 is arranged extending in the width direction of the apparatus (right-left direction in FIG. 8). The regulating wall 37 is a wall having a wall surface in the vertical direction (in the vertical direction with respect to the horizontal plane when the apparatus body is set on the horizontal plane) which comes into contact with the ink tubes 41 and is linearly erected along the reciprocating direction of the carriage 38. The regulating wall 37 is arranged along the extending direction of the ink tubes 41 from the position of the fixing clip 36 for fixing the ink tubes 41, and has a height high enough for all of the four ink tubes 41 arranged in the vertical direction by the fixing clip 36 to be brought into contact therewith.

The ink tubes 41 are extended along the regulating wall 37 from the fixing clip 36, and by making contact with the wall surface inside the regulating wall 37, they are restricted from swelling toward the front surface of the apparatus, in other words, in a direction remote from the carriage 38.

The fixing clip 36 is provided in the vicinity of nearly the center of the apparatus in the width direction, and the ink tubes 41 are fixed so as to extend toward the regulating wall 37. Namely, an obtuse angle smaller than 180° in plan view is formed by the vertical wall surface of the regulating wall 37 and the direction in which the ink tubes 41 are extended by the fixing clip 36. Although the ink tubes 41 have flexibility, they have also a suitable extent of elasticity (bending rigidity). Therefore, by being extended by the fixing clip 36 at a suitable angle with respect to the regulating wall 37, the ink tubes 41 are pressed against the wall surface of the regulating wall 37. Thus, in the reciprocating range of the carriage 38, the range in which the ink tubes 41 are pressed against along the regulating wall 37 is increased, and it is possible to decrease the range, from the curved portion connected to the carriage 38 of the ink tubes 41, swelling toward the backside of the apparatus, in other words, toward the carriage 38.

The fixing clip 86 is provided in the vicinity of the center of the apparatus in the width direction (right-left direction) and on the backside of the apparatus more than the fixing clip 36, and fixes the flat cable 85 so as to extend toward the regulating wall 37. Namely, the vertical wall surface of the regulating wall 37 and the direction extending the flat cable 85 by the fixing clip 86 forms the obtuse angle smaller than 180° in plan view. Although the flat cable 85 has the flexibility, it also has a suitable extent of elasticity (bending rigidity). Therefore, by being extended by the fixing clip 86 at a suitable angle with respect to the regulating wall 37, the flat cable 85 is pressed against the wall surface of the regulating wall 37. Thus, in the reciprocating range of the carriage 38, the range in which the flat cable 85 is pressed along the regulating wall 37 is increased, and it is possible to decrease the range, from the curved portion to the portion connected to the carriage 38 of the flat cable 85, swelling toward the backside of the apparatus, in other words, toward the carriage 38.

Figure 12:
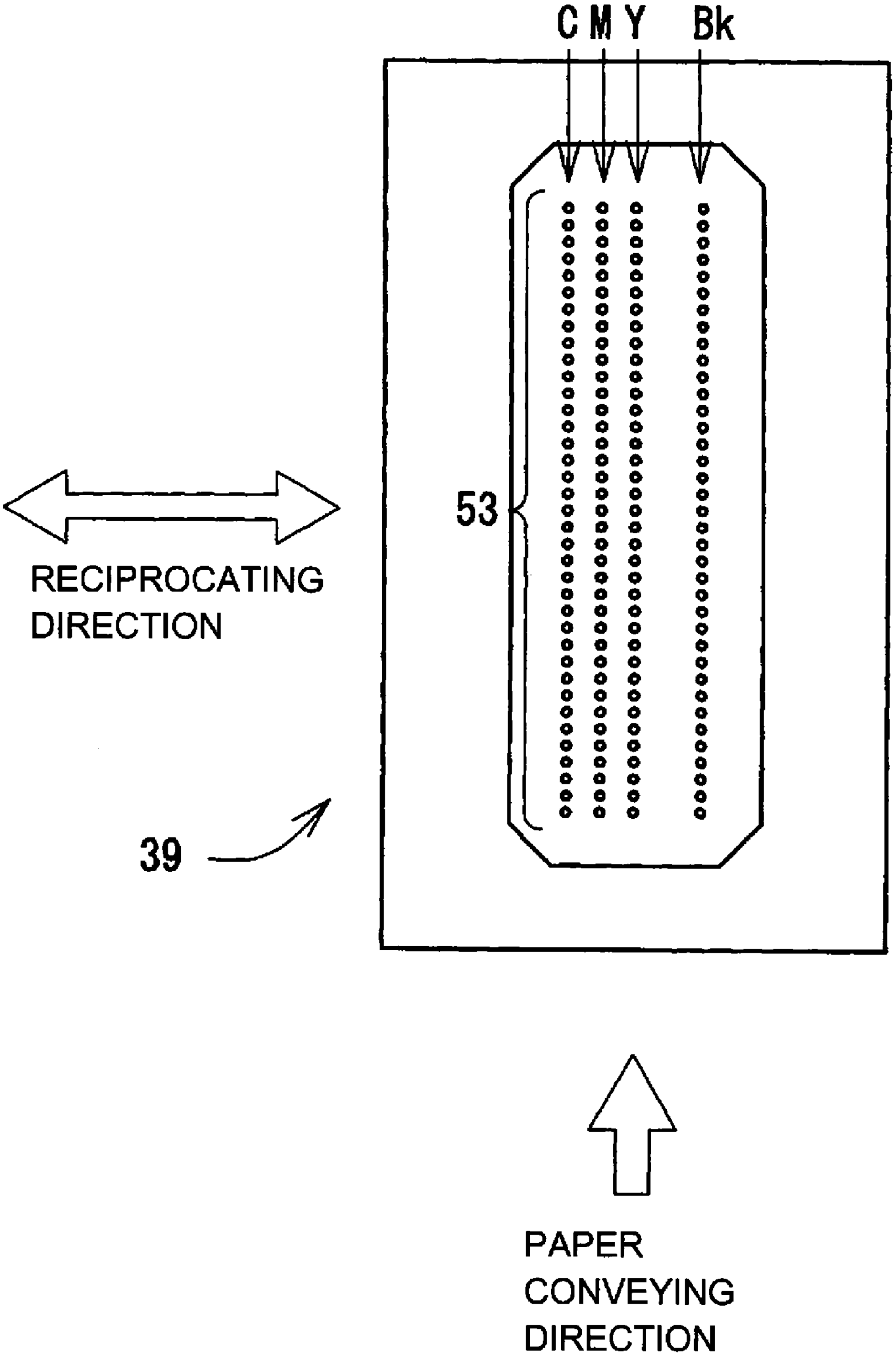
FIG. 12 is a bottom view showing the nozzle forming surface of an ink jet recording head.

FIG. 12 is a bottom view showing the nozzle forming surface of the ink jet recording head 39. As shown in the figure, on the lower surface of the ink jet recording head 39, nozzles 53 are disposed in a row in the paper conveying direction, for each color ink of cyan (C), magenta (M), yellow (Y), and black (Bk). Note that in FIG. 12, the vertical direction is the paper conveying direction, and the right-left direction is the reciprocating direction of the carriage 38. The nozzles 53 of each color ink of CMYBk have nozzles of the same color arranged in the paper conveying direction, respectively, and the arrangement of the nozzles 53 of each color ink line up in the reciprocating direction of the carriage 38. The pitch and the number of each nozzle 53 in the paper conveying direction may be suitably set in consideration of a resolution and the like of a recording image. Also, the number of rows of the nozzles 53 can be increased/decreased in accordance with the number of the kinds of color ink (the number of colors).

Figure 13:
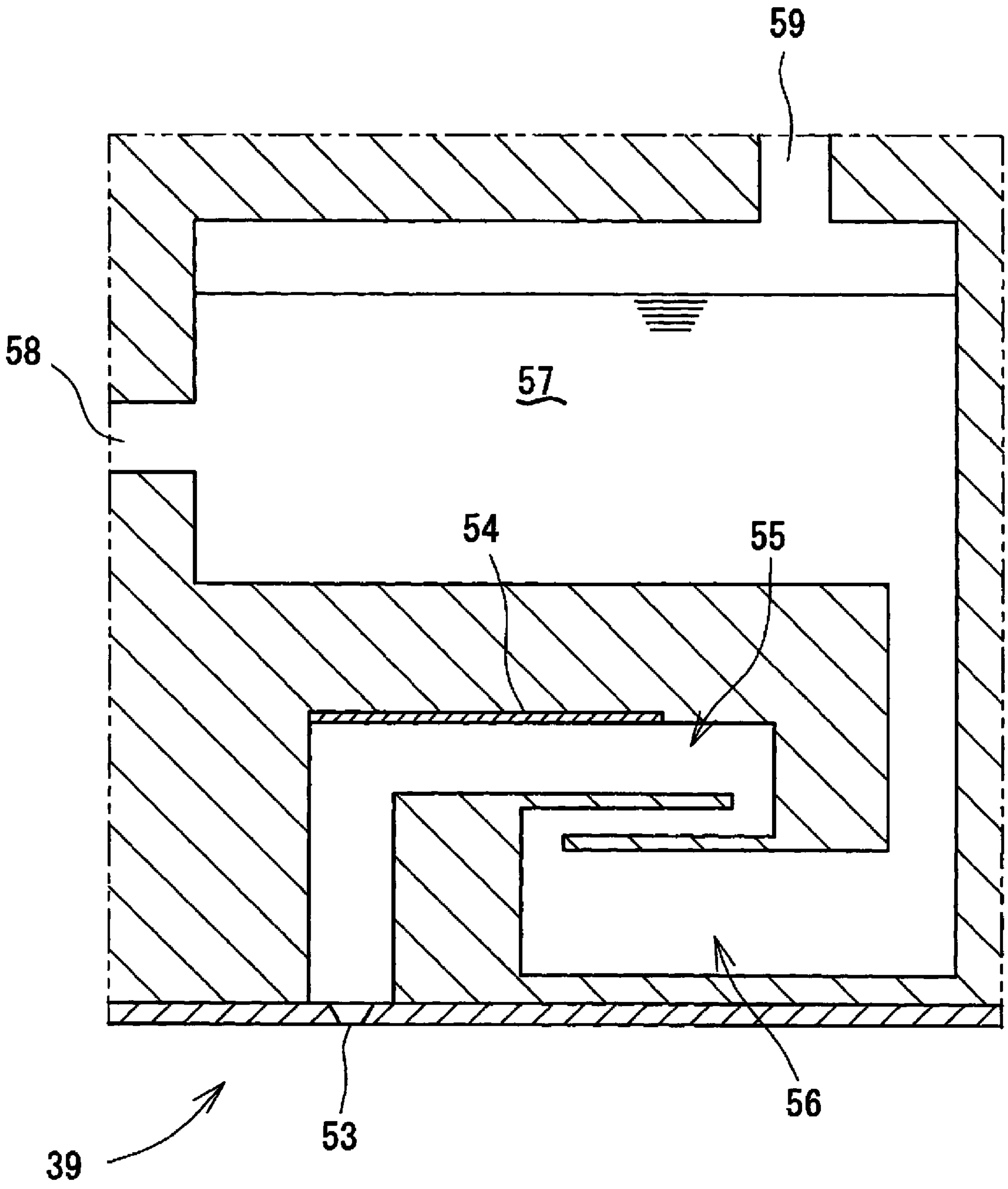
FIG. 13 is an enlarged sectional view showing the internal configuration of the ink jet recording head.

FIG. 13 is an enlarged sectional view showing the internal configuration of the ink jet recording head 39. As shown in the figure, a cavity 55 equipped with a piezoelectric element 54 is formed on the upstream side of the nozzles 53 formed on the lower surface of the ink jet recording head 39. The piezoelectric element 54 is deformed when a predetermined voltage is applied thereto, and makes a volume of the cavity 55 be reduced. In accordance with the change of the volume of this cavity 55, the ink in the cavity 55 is ejected from the nozzles 53 as an ink droplet.

A cavity 55 is provided for each nozzle 53, and a manifold 56 common to a plurality of cavities 55 is formed. The manifold 56 is provided for each color ink of CMYBk. A buffer tank 57 is disposed on the upstream side of the manifold 55. The buffer tank 57 is also provided for each color ink of CMYBk. The ink flowing in the ink tube 41 is supplied to each buffer tank 57 from an ink supply port 58. By storing the ink once in the buffer tank 57, the bubble generated in the ink is captured by the ink tube 41 and the like, and invasion of the bubble into the cavity 55 and the manifold 56 is prevented. The bubble captured in the buffer tank 57 is sucked and removed by a pump mechanism from a bubble discharge port 59. The ink supplied from the buffer tank 57 to the manifold 56 is distributed to each cavity 55 by the manifold 56.

In this way, an ink passage is constituted so that each color ink supplied from the ink cartridge through the ink tube 41 flows to the cavity 55 through the buffer tank 57 and the manifold 56. Each color ink of CMYBk thus supplied through the aforementioned ink passage is ejected onto the recording paper from the nozzles 53 as an ink droplet.

As shown in FIG. 7, a pair of a conveying roller 60 and a pinch roller are provided on the upstream side of the image recording unit 24. In FIG. 7, although the pinch roller is concealed by other member and not shown, it is disposed on the lower side of the conveying roller 60 in a state of being brought into pressure-contact therewith. The conveying roller 60 and the pinch roller pinch a paper sheet conveyed on the paper conveying path 23, and convey it on the platen 42. A pair of a paper discharge roller 62 and a spur roller 63 are provided on the downstream side of the image recording unit 24. The paper discharge roller 62 and the spur roller 63 pinch a recorded recording paper and convey it to the paper discharge tray 21. A driving force is transmitted from the LF motor 71 (See FIG. 14), and by this driving force, the conveying roller 60 and the paper discharge roller 62 are intermittently driven at a predetermined line feed width. Rotations of the conveying roller 60 and the paper discharge roller 62 are synchronized. A rotary encoder 76 (See FIG. 14) provided in the conveying roller 60 detects a pattern of an encoder disk 61 rotating together with the conveying roller 60. Based on this detection signal, the rotation of the conveying roller 60 and the paper discharge roller 62 are controlled.

The spur roller 63 are brought into pressure-contact with the recorded recording paper, and therefore a roller surface is formed in a spur-shape so as not to deteriorate the image recorded on the recording paper. The spur roller 63 is slidably provided in a direction of coming into contact with or separating from the paper discharge roller 62, and energized by a coil spring so as to be brought into pressure-contact with the paper discharge roller 62. When the recording paper enters between the paper discharge roller 62 and the spur roller 63, the spur roller 63 retreats opposing an energizing force by an amount of a thickness of the recording paper. Whereby, the recording paper is pinched therebetween so as to be brought into pressure-contact with the paper discharge roller 62. Thus, the rotating force of the discharge roller 62 is surely transmitted to the recording paper. The pinch roller is similarly provided with respect to the conveying roller 60, pinches the recording paper so as to be brought into pressure-contact with the conveying roller 60, and surely transmit the rotating force of the conveying roller 60 to the recording paper.

Figure 14:
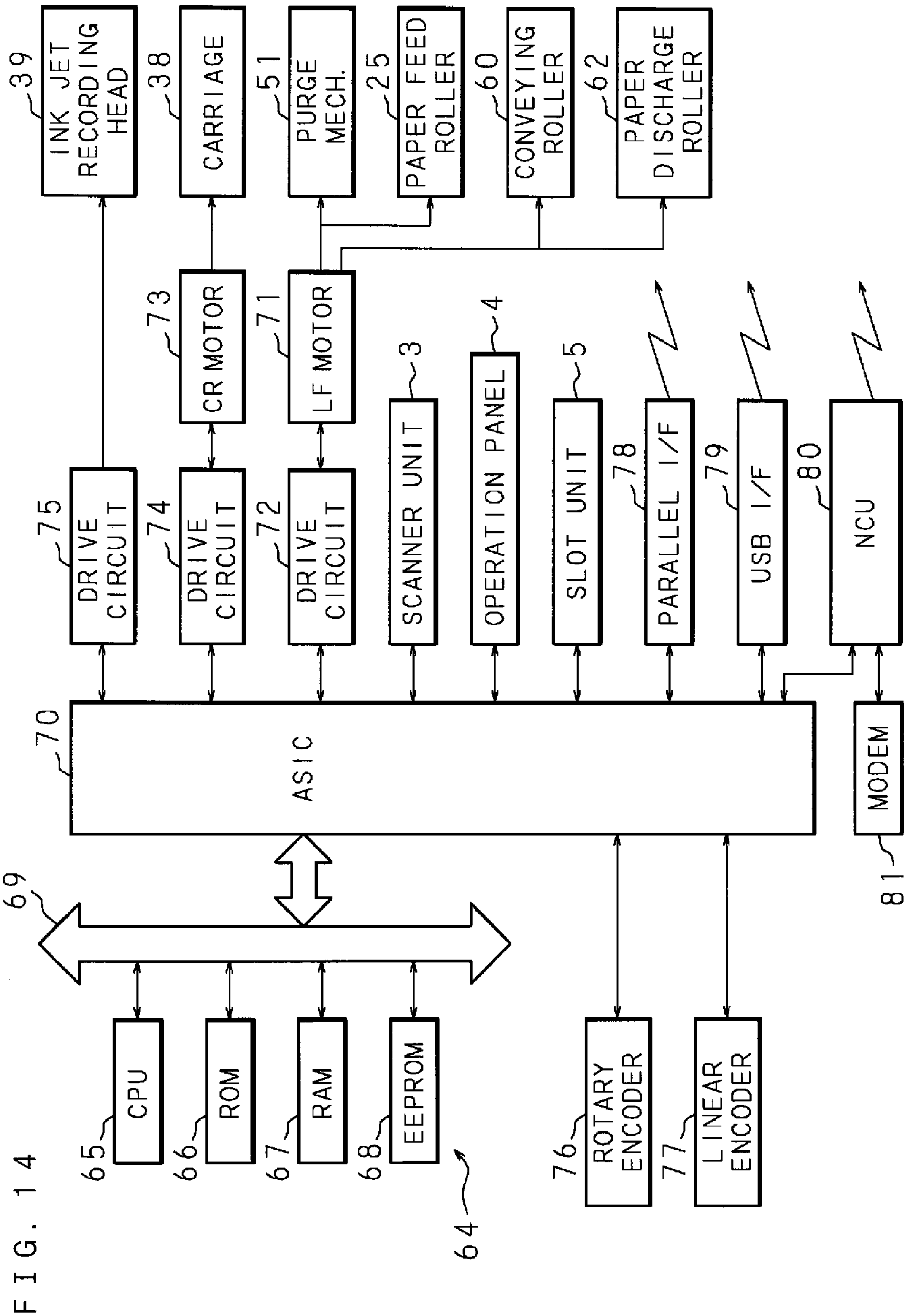
FIG. 14 is a block diagram showing a configuration of a controlling unit of the MFD according to the embodiment of the present invention.

FIG. 14 is a block diagram showing a configuration of a controlling unit 64 of the MFD 1 according to the embodiment of the present invention. The control unit 64 controls an entire operation of the MFD 1 including not only the printer unit 2 but also the scanner unit 3. Note that the control unit 64 is composed of a main substrate having the flat cable 85 connected thereto. However, the configuration of the scanner unit 3 is not a main configuration of the present invention, and therefore a detailed explanation is omitted.

As shown in FIG. 14, the control unit 64 is constituted as a micro computer mainly composed of a CPU (Central Processing Unit) 65, a ROM (Read Only Memory) 66, a RAM (Random Access Memory) 67, and an EEPROM (Electrically Erasable and Programmable ROM) 68, and is connected to an ASIC (Application Specific Integrated Circuit) 7 through a buss 69.

The ROM 66 stores a program and the like for controlling each kind of operation of the MFD 1. The RAM 67 is used as a storage area or a working area temporarily storing each kind of data used when the above-described program is executed by the CPU 65. In addition, the EEPROM 68 stores a setting and a flag and the like to be held after turning off a power source.

By following the instruction from the CPU 65, the ASIC 70 generates a phase excitation signal and the like for applying to the LF (conveying) motor 71, and gives it to a drive circuit 72 of the LF motor 71. By following the signal thus given, the drive circuit 72 controls the rotation of the LF motor 71 by applying the drive signal to the LF motor 71.

The drive circuit 72 drives the LF motor 71 connected to the paper feed roller 25, conveying roller 60, paper discharge roller 62, and purge mechanism 51. By receiving an output signal from the ASIC 70, the drive circuit 72 generates an electric signal for rotating the LF motor 71. By receiving the electric signal, the LF motor 71 is rotated, and by the rotation of the LF motor 71, the rotating force of the LF motor 71 is transmitted to the paper feed roller 25, conveying roller 60, paper discharge roller 62, and purge mechanism 51, through a well known drive mechanism composed of gears and drive shafts.

By following the instruction from the CPU 65, the ASIC 70 generates a phase excitation signal and the like to be applied to the CR (carriage) motor 73, and gives it to a drive circuit 74 of the CR motor 73. By following the signal thus given, the drive circuit 74 controls the rotation of the CR motor 73 by applying the drive signal to the CR motor 73.

The drive circuit 74 drives the CR motor 73. By receiving the output signal from the ASIC 70, the drive circuit 74 generates the electric signal for rotating the CR motor 73. By receiving the electric signal, the CR motor 73 is rotated, and by the rotation of the CR motor 73, the rotating force of the CR motor 73 is transmitted to the carriage 38 through the belt drive mechanism 46, thereby reciprocating the carriage 38. In this way, the reciprocating motion of the carriage 38 is controlled by the control unit 64.

A drive circuit 75 makes each color ink selectively eject from the ink jet recording head 39 onto the recording paper at a predetermine timing. Based on a drive control procedure outputted from the CPU 65, the drive circuit 75 receives the output signal generated in the ASIC 70, and controls a drive of the ink jet recording head 39. The drive circuit 75 is mounted on the head control substrate, and the signal is transmitted by the flat cable 85 from the main substrate to the head control substrate constituting the control unit 64.

To the ASIC 70, the rotary encoder 76 for detecting a rotational amount of the conveying roller 60 and the linear encoder 77 for detecting the position of the carriage 38 are connected. The carriage 38 moves to one of the end portions of the guide rails 43 and 44 by turning on the MFD 1, and a detected position by the linear encoder 77 is initialized. When the carriage 38 moves on the guide rails 43 and 44 from such an initial position, the optical sensor 35 provided on the carriage 38 detects the pattern of the encoder strip 50, and the number of pulse signals based on this pattern is grasped by the control unit 64 as a reciprocating amount of the carriage 38. The control unit 64 controls the rotation of the CR motor 73 so as to control the reciprocating motion of the carriage 38 based on its moving amount.

To the ASIC 70, the scanner unit 3, the operation panel 4 for performing an operating instruction of the MFD 1, the slot unit 5 into which each kind of small-sized memory card is inserted, a parallel interface (I/F) 78 and a USB interface (I/F) 79 for transmitting and receiving data to and from external information apparatus such as a personal computer through a parallel cable or a USB cable, and so forth are connected. Further, an NCU (Network Control Unit) 80 and a modem (MODEM) 81 for realizing a facsimile function are connected to the ASIC 70.

Figure 15A:
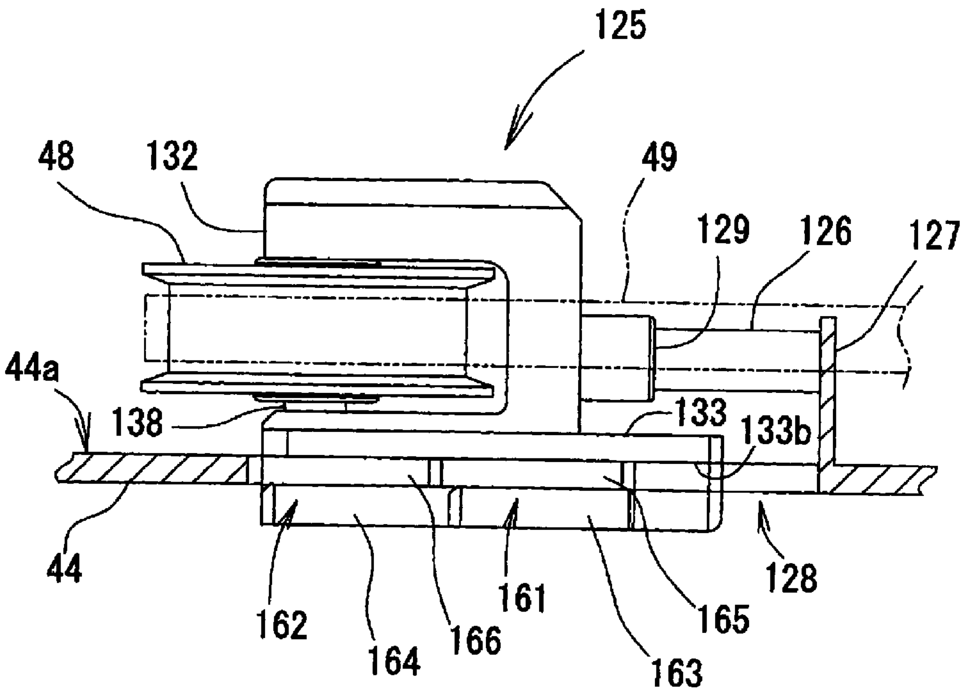
FIG. 15A and FIG. 15B are front views of the pulley holder viewed from the direction XV-XV of FIG. 10.
Figure 15B:
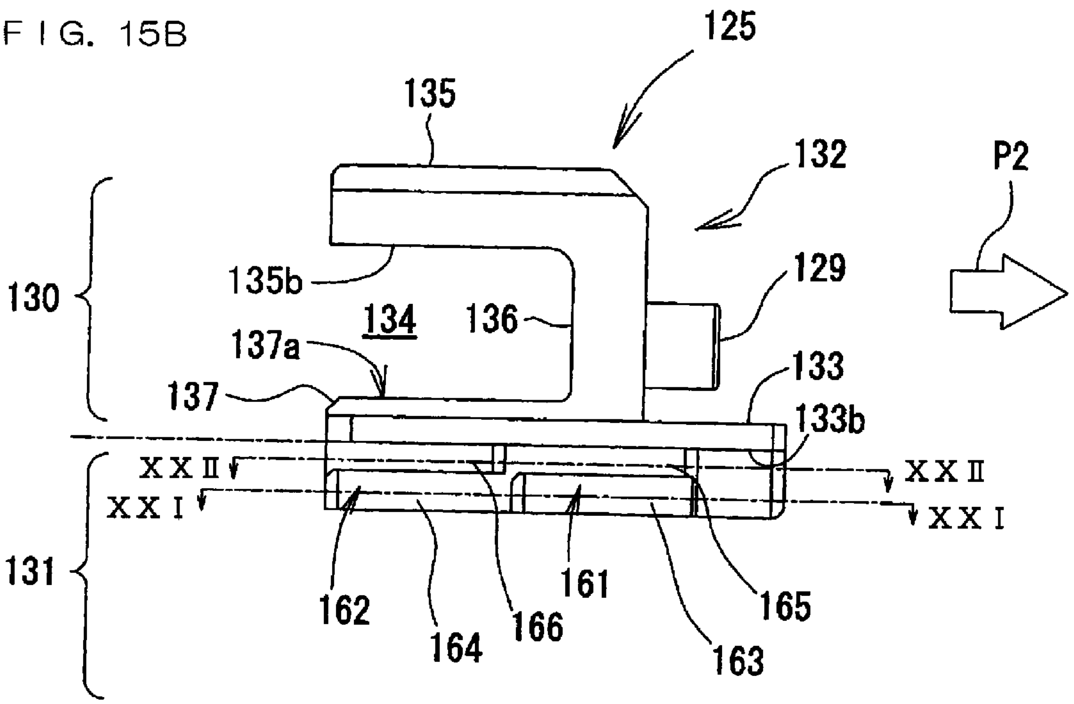
Figure 16A:
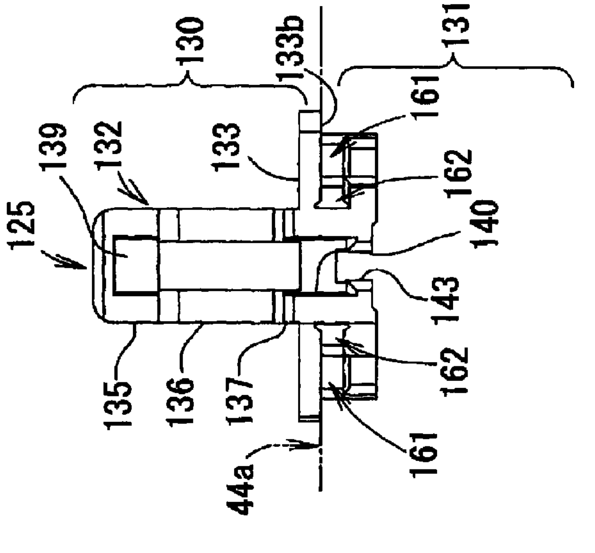
FIG. 16A, FIG. 16B, and FIG. 16C are a left side view, a front view, and a right side view showing the external appearance of the pulley holder.
Figure 16B:
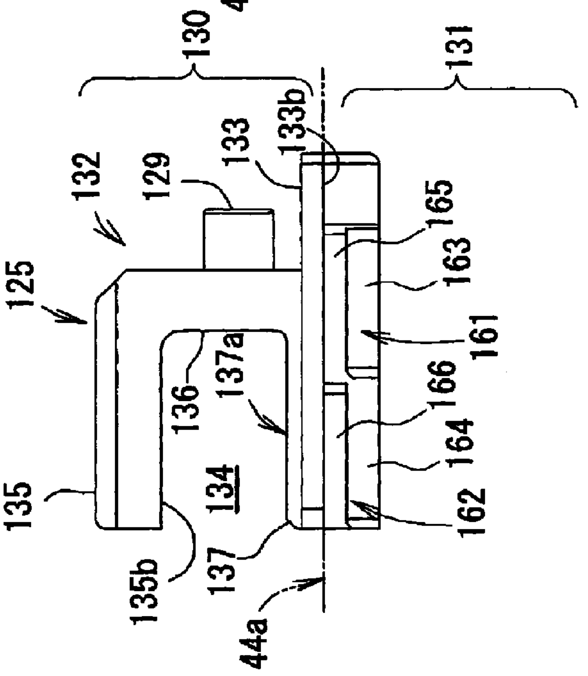
Figure 16C:
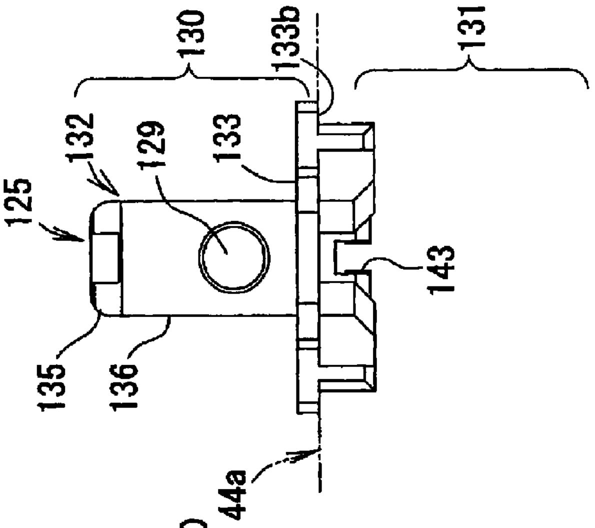
Figure 17:
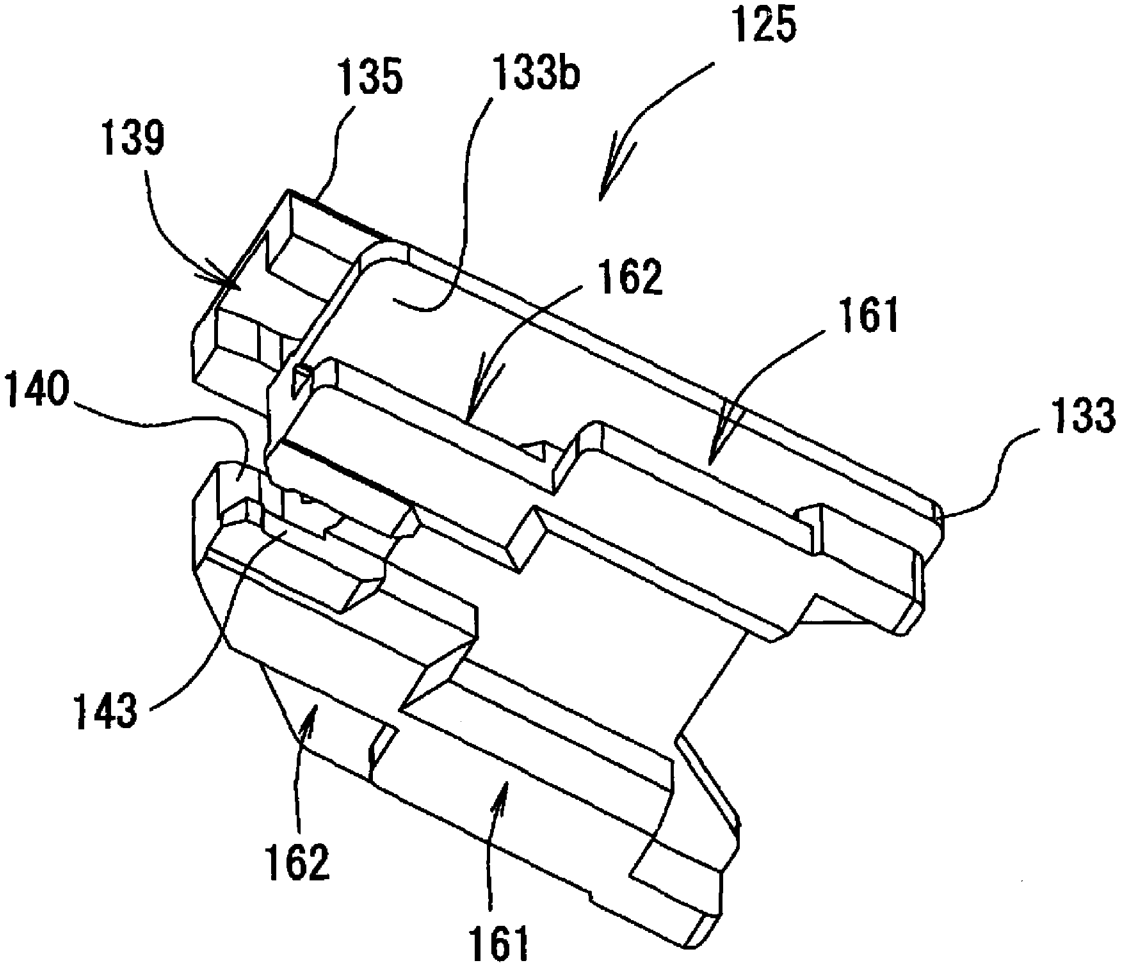
FIG. 17 is a schematic perspective view of the pulley holder viewed from diagonally from bellow.
Figure 18B:
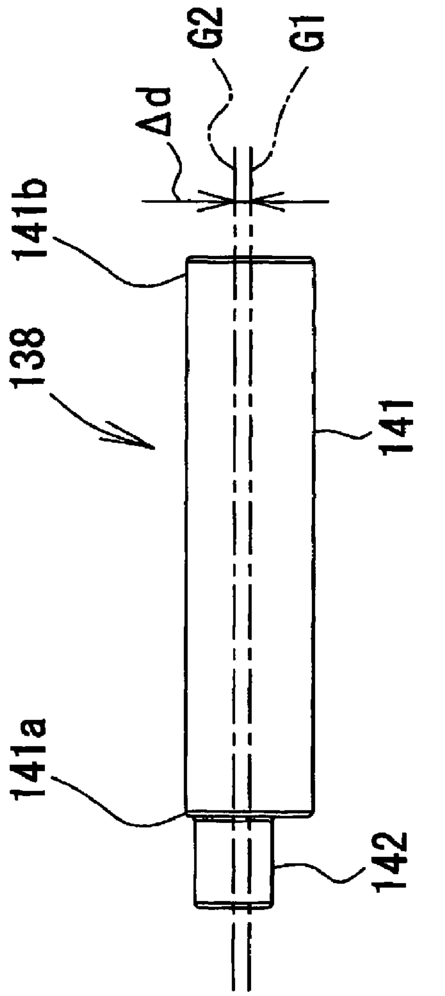
FIG. 18A, FIG. 18B, and FIG. 18C are three side views showing an external appearance of a shaft of the driven pulley.
Figure 18A:
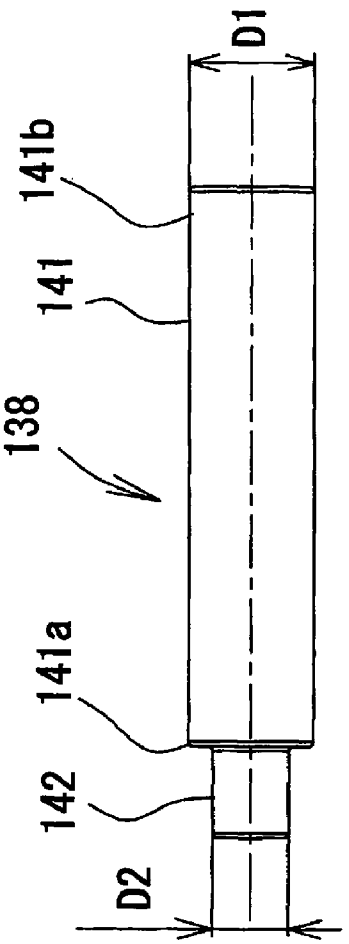
Figure 18C:
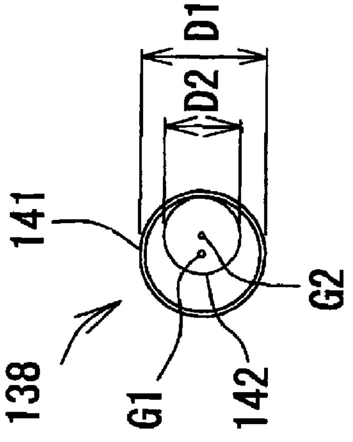
Figure 19:
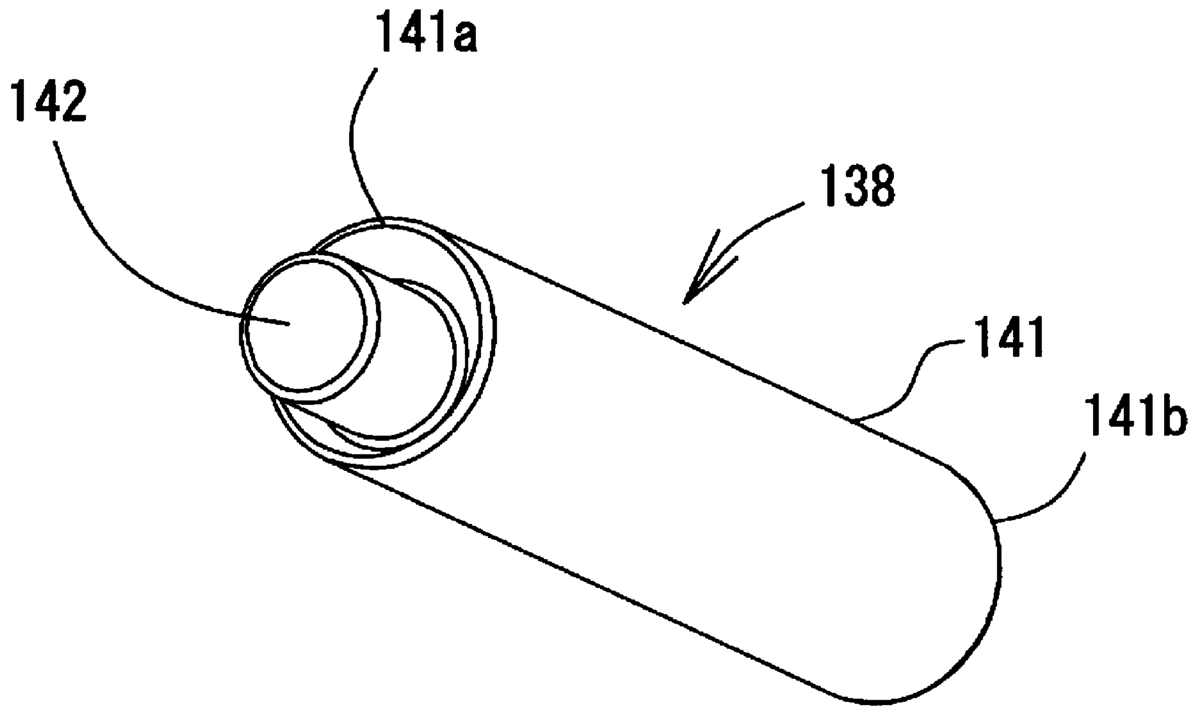
FIG. 19 is a schematic perspective view showing the external appearance of the shaft of the driven.
Figure 20A:
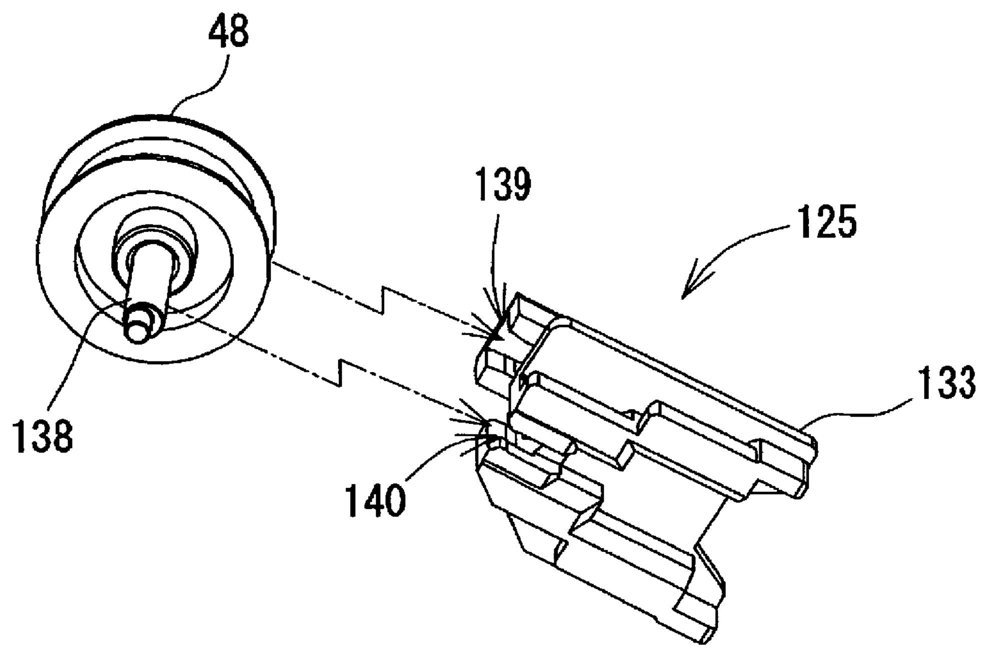
FIG. 20A and FIG. 20B are schematic perspective views illustrating an assembling structure of the driven pulley to the pulley holder.
Figure 20B:
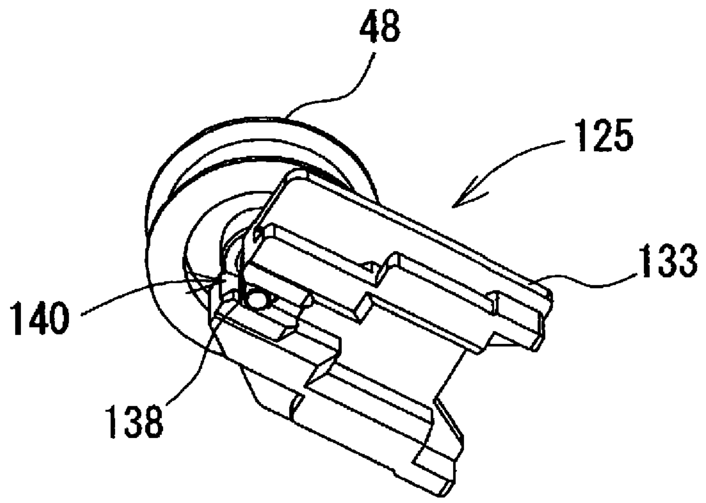
Figure 21:
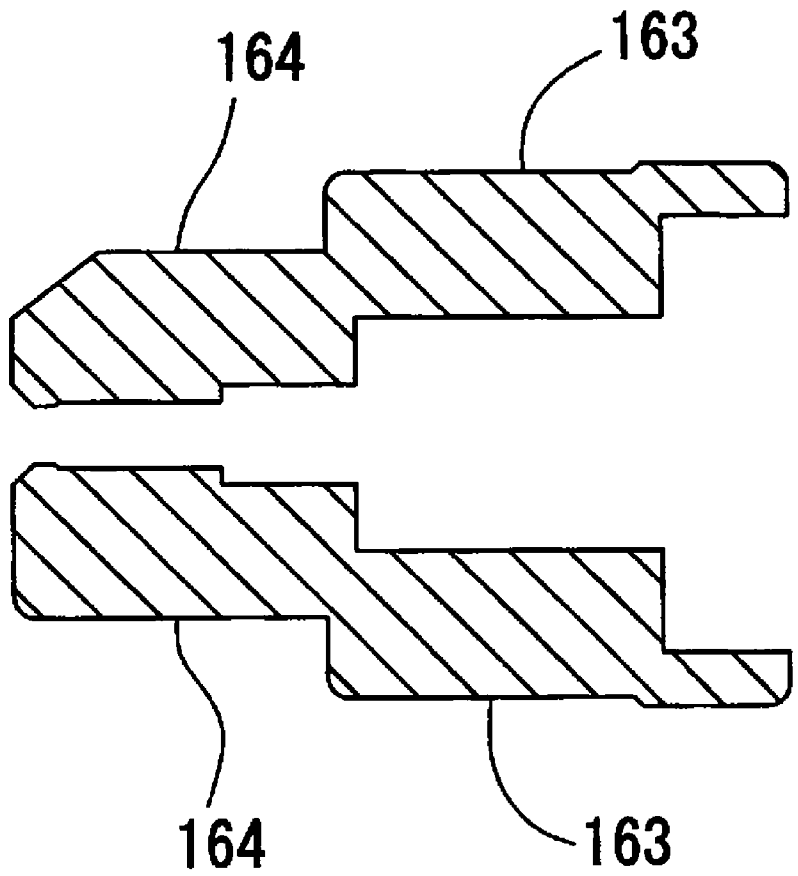
FIG. 21 is a plan cross sectional view showing a cross section of the pulley holder taken along the line XXI-XXI in FIG. 15B.
Figure 22:
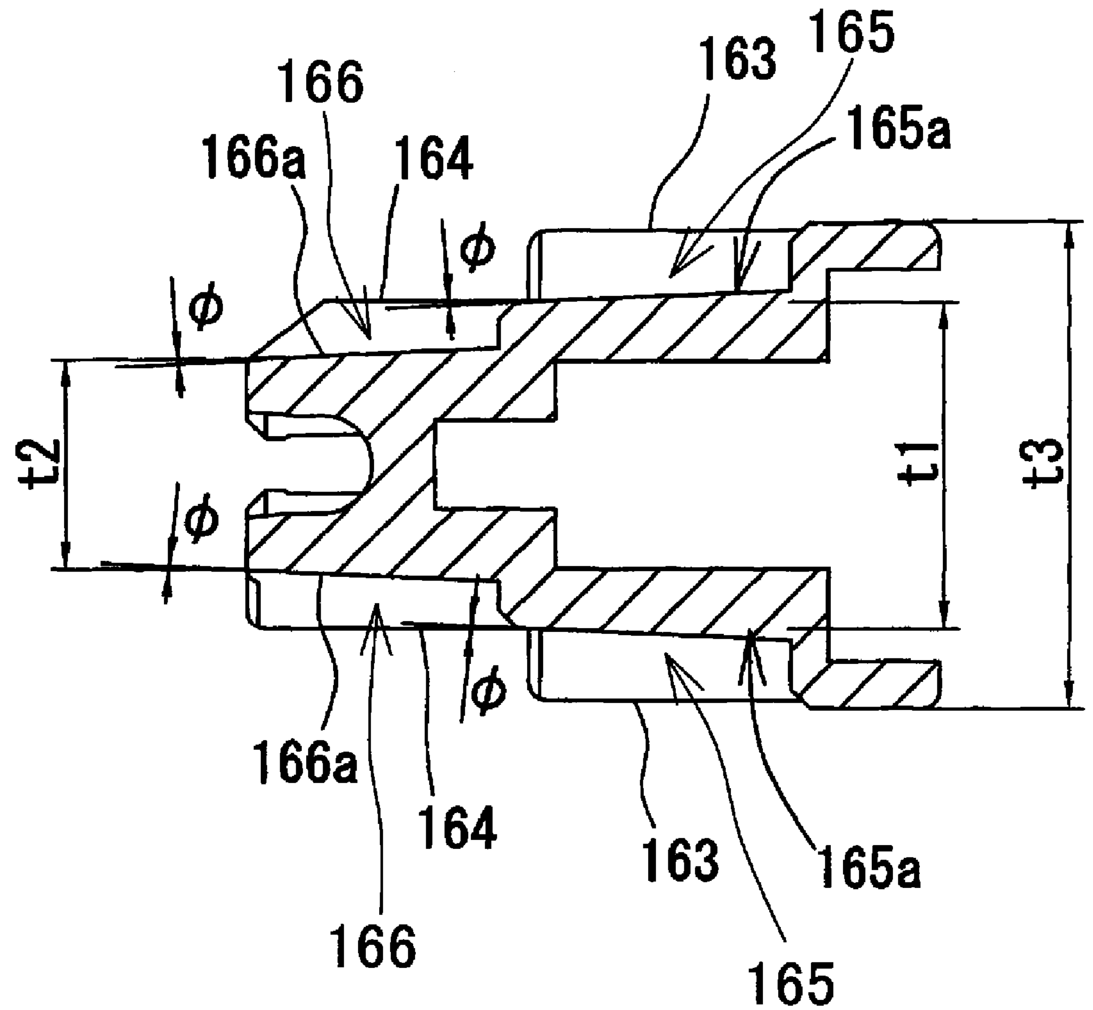
FIG. 22 is a plan cross sectional view showing a cross section of the pulley holder taken along the line XXII-XXII in FIG. 15B.

The supporting structure of the driven pulley 48 and the supporting structure of the pulley holder 125 will now be described in more detail referring to FIG. 15A and FIG. 15B through FIG. 22. FIG. 15A and FIG. 15B are front views of the pulley holder 125 viewed from the line XV-XV of FIG. 10. FIGS. 16A, 16B, and 16C are left side, front, and right side views showing the external appearance of the pulley holder 125. FIG. 17 is a schematic perspective view of the pulley holder 125 viewed from diagonally from below. FIG. 18A, FIG. 18B, and FIG. 18C are three side views showing an external appearance of a shaft 138 of the driven pulley 48. FIG. 19 is a schematic perspective view showing the external appearance of the shaft 138 of the driven pulley 48. FIG. 20A and FIG. 20B are schematic perspective views illustrating an assembling structure of the driven pulley 48 to the pulley holder 125. FIG. 21 is a plan cross sectional view showing a cross section of the pulley holder 125 taken along the line XXI-XXI in FIG. 15B. FIG. 22 is a plan cross sectional view showing a cross section of the pulley holder 125 taken along the line XXII-XXII in FIG. 15B.

The pulley holder 125 according to the embodiment is fabricated by a synthetic resin such as ABS resin, acrylic resin (methyl methacrylate), polypropylene (PP), polycarbonate (PC), polyacetal (POM), and polybutylene terephthalete (PBT), and formed by using a molding die. Though injection molding, for example, is general as the molding using a die, any other known technique may be used. A metal die is generally used. Molding dies made of various materials such as glass, resin, ceramic can be used as long as they are suitable for molding the pulley holder 125. For facilitating the removal from the die, a predetermined draft angle is formed on the pulley holder 125. In this embodiment, the pulley holder 125 is molded while the right side in FIG. 15B is made to be a parting line. Accordingly, the pulley holder 125 is drawn out from the die from the left side to the right side in FIG. 15B (in a direction of an arrow P2). Therefore, in the pulley holder 125, draft angles from 0.5° to 2° as tapered from the right side to the left side in FIG. 15B is formed.

As shown in FIG. 15B, FIG. 16A, FIG. 16B, and FIG. 16C, the pulley holder 125 is divided roughly into an upper half portion 130 exposed at the upper surface 44*a* of the guide rail 44 and a lower half portion 131 inserted in the holder fitting opening 128 (See FIG. 11) opened in the guide rail 44. FIG. 16A is a left side view of the pulley holder 125 shown in FIG. 15A and FIG. 15B. FIG. 16B is a front view of the pulley holder 125. FIG. 16C is a right side view of the pulley holder 125 shown in FIG. 15A and FIG. 15B.

In the upper half portion 130 of the pulley holder 125, a base 133 and a support arm 132 are formed. The base 133 makes surface contact with the upper surface 44*a* of the guide rail 44 when the lower half portion 131 of the pulley holder 125 is inserted in the holder fitting opening 128 opened in the guide rail 44. The support arm 132 is provided to extend upwardly and vertically from the base 133. The support arm 132 has a lying U shape when viewed from the front (See FIG. 16B). More particularly, the support arm 132 is formed integral with the base 133 and its lying U shape is formed by an arm lower portion 137 extending parallel with the upper surface of the base 133, an arm base portion 136 extending upwardly from one end of the arm lower portion 137, and an arm upper portion 135 extending from the upper end of the arm base portion 136 towards the extending direction of the arm lower portion 137. In an inner space 134 surrounding by the arm upper portion 135, the arm base portion 136, and the arm lower portion 137, that is, the inner space 134 provided in the lying U shape of the support arm 132, the driven pulley 125 (See FIG. 15A) is accommodated.

As shown in FIG. 16A, at a tip end side of the lower surface 135*b* of the arm upper portion 135, a bearing 139 is formed. The bearing 139 bears one end portion 141*b* of the shaft 138 of the driven pulley 48 (See FIG. 18A and FIG. 18B). Also as shown in FIG. 16A, another bearing 140 is formed extending from a tip end side of the upper surface 137*a* of the arm lower portion 137 to the lower half portion 131. The bearing 140 bears the other end portion 141*a* of the shaft 138 of the driven pulley 48 (See FIG. 18A and FIG. 18B). The two bearings 139 and 140 are grooves formed in the arm upper portion 135 and the arm lower portion 137 each of which extends in the direction of extending direction of the arm lower portion 137 and the arm upper portion 135, respectively. In the arm upper portion 135 and the arm lower portion 137, curved surfaces each having substantially equal in the curvature radius of an outer periphery of the shaft born by the bearings 139 and 140, respectively.

The shaft 138 of the driven pulley 48 is comprised of a main shaft 141 of a cylindrical shape having predetermined outer diameter of D1 and an eccentric shaft 142 having an outer diameter of D2 (D2<D1) which is smaller than that of the main shaft 141, as shown in FIG. 18A, FIG. 18B, FIG. 18C, and FIG. 19. The greater part of the shaft 138 is formed by the main shaft 141, the shaft 138 rotatably supports the driven pulley 48. While the main shaft 141 and the eccentric shaft 142 are formed integral with each other from metal such as steel, the eccentric shaft 142 extends axially from one end portion of the main shaft 141. The eccentric shaft 142 is provided for restraining the rotation of the main shaft 141. The axial center G2 of the eccentric shaft 142 does not coincide with but offsets by a distance Δd from the axial center G1 of the main shaft 141.

The eccentric shaft 142 side of the shaft 138 is born by the bearing 140 at the arm lower portion 137 side. More particularly, the main shaft 141 is born at the other end portion 141*a*, from which the eccentric shaft 142 extends axially, by the bearing 140. The eccentric shaft 142 is pinched and held in a fitting groove 143 (See FIGS. 16A, 16C, and 17) by fitting in the fitting groove 143 provided at the lower portion of the bearing 140. The bearing 140 is formed and having groove width corresponding to the outer diameter of the main shaft 141. More particularly, the groove width (the distance in the right-left direction in FIG. 16A) of the bearing 140 is formed in a diameter equal to a sum of the outer diameter of the main shaft 141 and a nominal tolerance. The one end portion 141*b* of the main shaft 141 is born by the bearing 139 of the arm upper portion 135 side. Accordingly, the groove width of the bearing 139 is hence formed as same as the groove width to the bearing 140. The groove width of the fitting groove 143 is substantially equal to the outer diameter of the eccentric shaft 142.

As described above, the axial center G2 of the eccentric shaft 142 is offset by the distance Δd from the axial center G1 of the main shaft 141. Accordingly, when the main shaft 141 of the shaft 138 is fitted into the bearing 140 and when the eccentric shaft 142 is fitted into the fitting groove 143, the axial center G1 of the main shaft 141 and the axial center G2 of the eccentric shaft 142 are positioned apart from each other along the lengthwise direction of the bearing 140 and the fitting groove 143, that is, the right-left direction in FIG. 15A. It is therefore necessary for rotating the main shaft 141 with respect to the bearing 140 to rotate the eccentric shaft 142 around the axial center G1 of the main shaft 141. However, since the eccentric shaft 142 is fitted into the fitting groove 143, its rotation around the axial center G1 is restricted. Accordingly, the main shaft 141 can not rotate with respect to the bearing 140.

As shown from FIG. 15A and FIG. 15B through FIG. 17, at the lower half portion 131 of the pulley holder 125, the first fitting portions 161 and the second fitting portions 162 are formed. The first fitting portions 161 are, as described later, engaged with the first edge portions 151 (See FIG. 11) formed at an inner periphery of the holder fitting opening 128 which is opened in the guide rail 44. Similarly, the second fitting portions 162 are engaged with the second edge portions 152 as described later (See FIG. 11) formed at the inner periphery of the holder fitting opening 128 which is opened in the guide rail 44. The first and second fitting portions 161 and 162 at one side are shown in FIG. 15A and FIG. 15B when viewed from the front side of the pulley holder 125. It is also noted that the fitting portions 161 and 162 are symmetrically provided on both, front and back, sides of the pulley holder 125. More specifically, a pair of the first and second fitting portions 161 and 162 are formed on the front side of the driven pulley holder 125 while another pair of the first and second fitting portions 161 and 162 are formed on the back side of the same.

The first fitting portion 161 comprises the base 133, a first rib 163 distanced downwardly by a predetermined space from the lower surface 133*b* of the base 133, and a groove 165 provided between the base 133 and the first rib 163. Similarly, the second fitting portion 162 comprises the base 133, a second rib 164 distanced downwardly by a predetermined space from the lower surface **133*b* of the base 133, and a groove 166 provided between the base 133 and the second rib 164. The vertical width of the grooves 165 and 166 are substantially equal to the thickness of the guide rail 44**.

As shown in FIG. 22, the distance is set to t1 between the bottoms **165*a* of the grooves 165 of the pair of first fitting portions 161 provided on both the front and back sides of the pulley holder 125. To the pair of grooves 165, the pair of first edge portions 151 formed at the inner periphery of the holder fitting opening 128 opened on the guide rail 44 are fitted, respectively. Accordingly, the distance t1 between the bottoms 165*a* of the grooves 165 is substantially equal to the distance h1 (See FIG. 11) between the pair of first edge portions 151. The distance between the bottoms 166*a* of the respective grooves 166 of the pair of second fitting portions 162 formed on both the front and back sides of the pulley holder 125 is set to t2 which is smaller than t1 of the distance between the bottoms 165*a* of the grooves 165 of the pair of first fitting portions 161. The pair of grooves 166 are, as described above, engaged with the two second edge portions 152 formed at the inner periphery of the holder fitting opening 128 of the guide rail 44 respectively. Accordingly, the distance t2 between the bottoms 166*a* of the grooves 166 is substantially equal to the distance h2 (See FIG. 11) between the bottoms of second edge portions 152. A step is formed between the bottom 165*a* and the bottom 166*a* such that the distance between the opposed bottoms 165*a*, 166*a* become smaller towards the grooves 166**.

As shown in FIG. 22, the predetermined draft angle ϕ to the removal direction (denoted by the arrow P2 in FIG. 15B) is formed on the bottoms **165*a* of the grooves 165 and the bottoms 166*a* of the grooves 166, respectively. Since the first fitting portions 161 having respective grooves 165 and the second fitting portions 162 having respective grooves 166 are stepwise formed along the removal direction as described above, dimensional differences, due to the draft angle, in the removal direction from the die in the distance t1 between the pair of bottoms 165*a* and the distance t2 between the pair of bottoms 166*a*** become smaller as compared when the fitting portion is not stepwise formed.

As shown in FIG. 11, at the inner periphery of the holder fitting opening 128 opened in the guide rail 44, the first edge portions 151 engaged with the first fitting portions 161 and the second edge portions 152 engaged with the second fitting portions 162 are formed. Two first edge portions 151 are formed at both sides, respectively opposing the paper conveying direction (top-bottom direction in FIG. 11) so as to make pair. Also, two second edge portions 152 are formed at both sides, respectively opposing the paper conveying direction of the belt 49 (top-bottom direction in FIG. 11) so as to make pair. The first edge portions 151 are formed corresponding to the pair of grooves 165 in the first fitting portions 161 and dimension of their distance h1 is formed so as to insert the bottoms **165*a* of the grooves 165. Similarly, the second edge portions 152 are formed corresponding to the pair of grooves 166 in the second fitting portions 162 and dimension of their distance h2 is formed so as to insert the bottoms 166*a* of the grooves 166. More specifically, the distance between the two first edge portions 151 and the distance between the two second edge portion 152 become gradually smaller from the first edge portions 151 side to the second edge portion 152 side. At the reverse side of the first edge portions 151 opposite to the second edge portions 152, that is, at the right side in FIG. 11, in the holder fitting opening 128, an insertion space 153 whose width is greater than the distance h1 between the two first edge portions 151 is opened. The width h3 of the insertion space 153 is greater than the distance t3 between the end portions of the two first ribs 163 of the pulley holder 125 (See FIG. 22**).

Before the lower half portion 131 of the pulley holder 125 is inserted from the upper to the lower into the holder fitting opening 128 opened in the guide rail 44, its first ribs 163 are aligned with the insertion space 153 and its second ribs 164 are set between the pair of first edge portions 151 at the holder fitting opening 128. Then, the pulley holder 125 is engaged at the first edge portions 151 and the second edge portions 152 with the grooves 165 and the grooves 166 respectively as being slid from the right side to the left side in FIG. 11. Then, the timing belt 49 is wound around the driven pulley 48 supported by the pulley holder 125 and inserting the coil spring 126 between the spring receiver 129 and the upright plate 127 as shown in FIG. 15A. As the result, the pulley holder 125 is urged by the coil spring 126 in the belt tensioning direction (towards the left side in FIG. 15A).

As described above, since the first fitting portions 161 and the second fitting portions 162 of the pulley holder 125 are stepwise formed along the belt tensioning direction, the dimensional differences, due to the draft angle, along the removal direction in the distance t1 between the two bottoms **165*a* of the grooves 165 of the first fitting portions 161 and the distance t2 between the two bottoms 166*a* of the grooves 166 of the second fitting portions 162 is small. Accordingly, the jerky movement of the engagement between the first edge portions 151 and the corresponding grooves 165 and between the second edge portions 152 and the corresponding grooves 166 can be minimized. As a result, since the scanning displacement of the carriage 38 resulting from the jerky movement of the pulley holder 125 is significantly decreased, the quality of images recorded by the action of the ink jet recording head 39** will be improved.

Also, since the first fitting portions 161 and the second fitting portions 162 are formed in a pair on both sides of the driven pulley 48 as extending in parallel to the belt tensioning direction, the pulley holder 125 can be supported in good balance with respect to the tension of the timing belt 49. This allows the driven pulley 48 to be increased and stabilized in the supported strength along the belt tensioning direction.

As set forth above, the structure for supporting the pulley holder according to the present invention has the fitting portions stepwise formed along the belt tensioning direction for engagement with the corresponding edge portions which are also stepwise formed. Accordingly, the pulley holder is supported at a plurality of points. As a result, the pulley can be increased in the supported strength along its rotating direction and minimized in the jerky movement during the circular movement of the belt.

As this invention may be embodied in several forms without departing from the sprit of essential characteristics thereof, the present embodiments are therefore illustrative and not restrictive, since the scope of the present invention is defined by the appended claims rather than by the description preceding them, and all changes that fall within metes and bounds of the claims, or equivalence of such meters and bounds thereof are therefore intended to be embraced by the claims.

What is claimed is:

1. A structure for supporting a pulley holder comprising:

a pulley holder configured to support a pulley such that the pulley is rotated by a belt stretched around the pulley; and a frame member configured to support the pulley holder such that the pulley holder slides in a first direction; wherein the pulley holder includes a first fitting portion and a second fitting portion that are arranged in the first direction, and a dimension of the first fitting portion in a second direction perpendicular to the first direction is larger than a dimension of the second fitting portion in the second direction;

the frame member includes a first fitting opening and a second fitting opening that are arranged in the first direction, and a dimension of the first fitting opening in the second direction is larger than a dimension of the second fitting opening in the second direction; and the first fitting portion and the second fitting portion are fitted into the first fitting opening and the second fitting opening, respectively.

2. The structure for supporting a pulley holder as set forth in claim 1, further comprising an urging member configured to elastically urge the pulley holder in a belt tensioning direction in which the belt is tensioned further, the belt tensioning direction being parallel to the first direction.

3. The structure for supporting a pulley holder as set forth in claim 1, wherein the pulley holder is molded from a synthetic resin.

4. The structure for supporting a pulley holder as set forth in claim 3, wherein each of the first fitting portion and the second fitting portion has a predetermined draft angle for molding.

5. The structure for supporting a pulley holder as set forth in claim 1, wherein the pulley holder supports the pulley that serves as a driven pulley and cooperates with a driving pulley to drive, via the belt stretched between the driving pulley and the driven pulley, a carriage in an image recording apparatus, and the carriage slides on the frame member while carrying thereon an ink jet recording head.

6. The structure for supporting a pulley holder as set forth in claim 1, wherein a coil spring as the urging member is provided between a bracket standing on the frame member and a spring receiver provided in the pulley holder.

7. The structure for supporting a pulley holder as set forth in claim 2, wherein the first fitting portion and the second fitting portion are arranged in decreasing order of the dimension in the second direction toward the belt tensioning direction.

8. The structure for supporting a pulley holder as set forth in claim 1, wherein the first direction is parallel to a direction in which the belt is stretched.

9. The structure for supporting a pulley holder as set forth in claim 1, wherein the first fitting portion includes a pair of first fitting portions that are opposed to each other in the second direction;

the second fitting portion includes a pair of second fitting portions that are opposed to each other in the second direction;

the first fitting opening is partially defined by a pair of first edges that are opposed to each other in the second direction;

the second fitting opening is partially defined by a pair of second edges that are opposed to each other in the second direction; and the pair of first fitting portions and the pair of second fitting portions are fitted to the pair of first edges and the pair of second edges, respectively.

10. The structure for supporting a pulley holder as set forth in claim 9, wherein the pulley holder includes a base whose lower surface makes contact with an upper surface of the frame member, the pair of first fitting portions include a pair of first ribs provided below the base and a pair of first grooves formed between the base and the pair of first ribs, and the pair of second fitting portions include a pair of second ribs provided below the base and a pair of second grooves formed between the base and the pair of second ribs.

11. The structure for supporting a pulley holder as set forth in claim 10, wherein the dimension of the first fitting portion in the second direction corresponds to a distance between bottoms of the first grooves, and the dimension of the second fitting portion in the second direction corresponds to a distance between bottoms of the second grooves.

12. The structure for supporting a pulley holder as set forth in claim 11, wherein the distance between the bottoms of the first grooves is substantially equal to a distance between the first edges, and the distance between the bottoms of the second grooves is substantially equal to a distance between the second edges.

13. The structure for supporting a pulley holder as set forth in claim 9, wherein each of the pair of the first fitting portions includes a surface facing and inclined with respect to a corresponding one of the pair of first edges, and each of the pair of second fitting portions includes a surface facing and inclined with respect to a corresponding one of the pair of second edges.

* * * * *